(12) United States Patent  
Chakraborty et al.

(10) Patent No.: US 9,195,867 B2
(45) Date of Patent: Nov. 24, 2015

(54) SYSTEM AND METHOD FOR AUTOMATED IDENTIFICATION OF A PHOTOGRAPHED SUBJECT AT A RESORT AREA

(71) Applicant: Vail Resorts, Inc., Broomfield, CO (US)

(72) Inventors: Sayan Chakraborty, Niwot, CO (US); Logan Bruns, Napa, CA (US); Robert Urwiler, Longmont, CO (US); Tim April, Lafayette, CO (US); Stephen Younge, Boulder, CO (US)

(73) Assignee: Vail Resorts, Inc., Broomfield, CO (US)

( * ) Notice: Subject to any disclaimer, the term of this patent is extended or adjusted under 35 U.S.C. 154(b) by 0 days.

(21) Appl. No.: 14/161,532

(22) Filed: Jan. 22, 2014

(65) Prior Publication Data

US 2014/0136106 A1 May 15, 2014

Related U.S. Application Data

(62) Division of application No. 12/060,132, filed on Mar. 31, 2008, now Pat. No. 8,669,845.

(60) Provisional application No. 60/908,993, filed on Mar. 30, 2007.

(51) Int. Cl.
| | |
|---|---|
| *G08B 13/14* | (2006.01) |
| *G08B 23/00* | (2006.01) |
| *H04Q 5/22* | (2006.01) |
| *G05B 19/00* | (2006.01) |
| *G06K 5/00* | (2006.01) |
| *G06Q 30/00* | (2012.01) |
| *G06Q 10/00* | (2012.01) |
| *G06K 7/10* | (2006.01) |
| *G06K 7/00* | (2006.01) |

(Continued)

(52) U.S. Cl.
CPC ............ *G06K 7/10425* (2013.01); *G01C 22/00* (2013.01); *G06K 7/00* (2013.01); *G06Q 10/0833* (2013.01); *G06Q 50/00* (2013.01); *G06Q 50/28* (2013.01)

(58) Field of Classification Search
CPC ....... G06F 21/35; G06F 21/31; G06F 21/335; G06K 7/00; G06K 7/0008; G08B 21/22; G07C 9/00309; G07F 7/1008; G06Q 30/0224; G06Q 10/063; G06Q 10/06375
USPC ......... 340/5.6, 5.52, 5.53, 10.1, 573.1, 572.1; 701/521; 235/382; 705/14.25, 7.11, 705/7.37
See application file for complete search history.

(56) References Cited

U.S. PATENT DOCUMENTS 6,198,431 B1     3/2001   Gibson
6,813,608 B1 *  11/2004   Baranowski ....................... 705/6

(Continued)

OTHER PUBLICATIONS

Chakraborty et al. Non-Final Office Action. U.S. Appl. No. 14/161,524. Mailing Date: Jul. 17, 2015. 32 pages.

*Primary Examiner* — Travis Hunnings
*Assistant Examiner* — Munear Akki
(74) *Attorney, Agent, or Firm* — Faegre Baker Daniels LLP

(57) ABSTRACT

A system and method monitor skier behavior. An identifier is read from a lift access product when the lift access product is in the vicinity of a lift boarding area and a scan record containing the identifier, location information of the lift boarding area and a time stamp if generated. The scan record is processed to generate a location event record that is stored within a location database. The location database is processed to determine skier behavior based upon the location event records.

13 Claims, 16 Drawing Sheets

(51) Int. Cl.
*G01C 22/00* (2006.01)
*G06Q 50/00* (2012.01)
*G06Q 10/08* (2012.01)
*G06Q 50/28* (2012.01)

(56) References Cited

U.S. PATENT DOCUMENTS

| | | | |
|---|---|---|---|
| 7,631,806 B2 * | 12/2009 | Wallerstorfer et al. | 235/382 |
| 2002/0008622 A1 * | 1/2002 | Weston et al. | 340/572.1 |
| 2002/0165758 A1 | 11/2002 | Hind et al. | |
| 2003/0050831 A1 | 3/2003 | Klayh | |
| 2003/0163287 A1 | 8/2003 | Vock et al. | |
| 2003/0220835 A1 * | 11/2003 | Barnes, Jr. | 705/14 |
| 2004/0201738 A1 * | 10/2004 | Moores et al. | 348/231.2 |
| 2004/0243468 A1 * | 12/2004 | Cohagan et al. | 705/14 |
| 2006/0073884 A1 | 4/2006 | Walker et al. | |
| 2006/0121972 A1 | 6/2006 | Walker et al. | |
| 2006/0124734 A1 * | 6/2006 | Wallerstorfer et al. | 235/382 |
| 2006/0259361 A1 | 11/2006 | Barhydt et al. | |
| 2006/0287072 A1 | 12/2006 | Walker et al. | |
| 2007/0087834 A1 | 4/2007 | Moser et al. | |
| 2007/0123280 A1 * | 5/2007 | McGary et al. | 455/466 |
| 2007/0176779 A1 | 8/2007 | Braunstein | |
| 2007/0205860 A1 | 9/2007 | Jones et al. | |
| 2007/0252001 A1 * | 11/2007 | Kail et al. | 235/380 |
| 2008/0182644 A1 * | 7/2008 | Lutnick et al. | 463/20 |

* cited by examiner

SYSTEM AND METHOD FOR AUTOMATED IDENTIFICATION OF A PHOTOGRAPHED SUBJECT AT A RESORT AREA

RELATED APPLICATIONS

This application claims priority to U.S. Provisional Application Ser. No. 60/908,993, filed Mar. 30, 2007 and incorporated herein by reference. This application is also a divisional of (and claims priority to) U.S. patent application Ser. No. 12/060,132, filed on Mar. 31, 2008, entitled "RFID Skier Monitoring Systems And Methods," which is incorporated herein by reference. This application is also related to U.S. patent application Ser. No. 14/161,528, entitled "RFID Skier Monitoring Systems And Methods," and U.S. patent application Ser. No. 14/161,524, entitled "System And Method For Tracking Activities Of A Customer At A Resort Area," filed on the same day as the present application, (Jan. 22, 2014), and which are incorporated herein by reference.

BACKGROUND

Traditional ski lift passes include a machine readable bar code that allows authentication of the lift pass using a remote hand-held scanner. Such authentication is performed only at lower ski lift boarding areas that are easily accessible by skiers; higher ski lift boarding being attainable only after utilizing the lower ski lift.

Other lift pass authentication systems utilizes RFID tags to control access at a turn-style, wherein an RFID scanner reads an RFID tag at a short range, typically between 0.5 and 2 feet (0.1524 and 0.6096 meter), and limits access to ski lifts, by control of the turn-style, to valid RFID tag holders.

SUMMARY OF THE INVENTION

In a unique approach to authenticating ski lift passes/tickets and determining customer 'presence' at ski lift boarding zones, customers are issued RFID-enabled ski lift access products (i.e., lift tickets and/or season passes) that may be scanned manually at ski resort base areas using handheld RFID scanners and scanned automatically at one or more ski lift boarding areas using strategically mounted overhead RFID scanners. Unlike other systems that require close proximity to operate, RFID scanning may occur at a range of 1-10 feet (3.048 meters) thereby allowing the ski lift access products to be read as customers of the ski area (i.e., patrons of the ski resort) board the ski lifts. The information gathered by these strategically placed RFID scanners forms the basis for distinctive insight into crowd behavior at the ski area and allows guest profiling to be conducted for purposes of marketing, resort operation, and guest servicing.

In an embodiment, an RFID skier monitoring system includes: a lift access product for each customer of a ski resort, the lift access product having a unique identifier; at least one RFID scanner located at a boarding location of one or more ski lifts, the at least one RFID scanner reading the unique identifier of each lift access product as customers board the one or more ski lifts, the at least one RFID scanner generating a scan record comprising the unique identifier, a scanner ID and a time stamp for each unique identifier read; a location event generator for generating a location event record for each scan record; a location database for storing the location event record; and a service application for processing the location database to determine a profile of a skier using the lift access product.

In another embodiment, a method monitors skier behavior. An identifier is read from a lift access product when the lift access product is within a lift boarding area. A scan record containing the identifier, location information of the lift boarding area and a time stamp is generated. The scan record is processed to generate a location event record which is stored within a location database. The location database is processed to determine skier behavior based upon the location event record.

DETAILED DESCRIPTION OF THE FIGURES

Information Gathering

A ski resort utilizes lift access products to control access to ski lifts and, optionally, other facilities at the resort. These lift access products may be divided into at least two classes: a first class lift access product (e.g., season passes), which has descriptive information (e.g., personal information of the lift product holder) associated therewith; and a second class lift access product (e.g., free sell lift tickets) does not include such associated information. The descriptive (personal) information associated with the first class lift access product may include a photograph, and/or demographic information such as gender, birthday, and zip code of the lift access product holder. The first class lift access product holder is thus a known and registered customer of the resort. The second class list access product is not initially associated with "a customer".

Each lift access product (all classes) is affiliated with a unique identifier that may be scanned at a time of authentication (e.g., at the bottom of the mountain prior when entering a ski lift line), or at a time of presence monitoring (e.g., while boarding a ski lift). Data gathered at the time of authentication and/or presence monitoring includes the unique identifier of the lift access product, location information of the authentication and/or presence monitoring, and a date/time stamp that indicates the time of the authentication and/or presence monitoring.

In an embodiment, each lift access product may require activation at a kiosk or other resort activation point, prior to use for that day. In an alternate embodiment, each lift access product is automatically activated upon first use at the resort.

Figure 1:
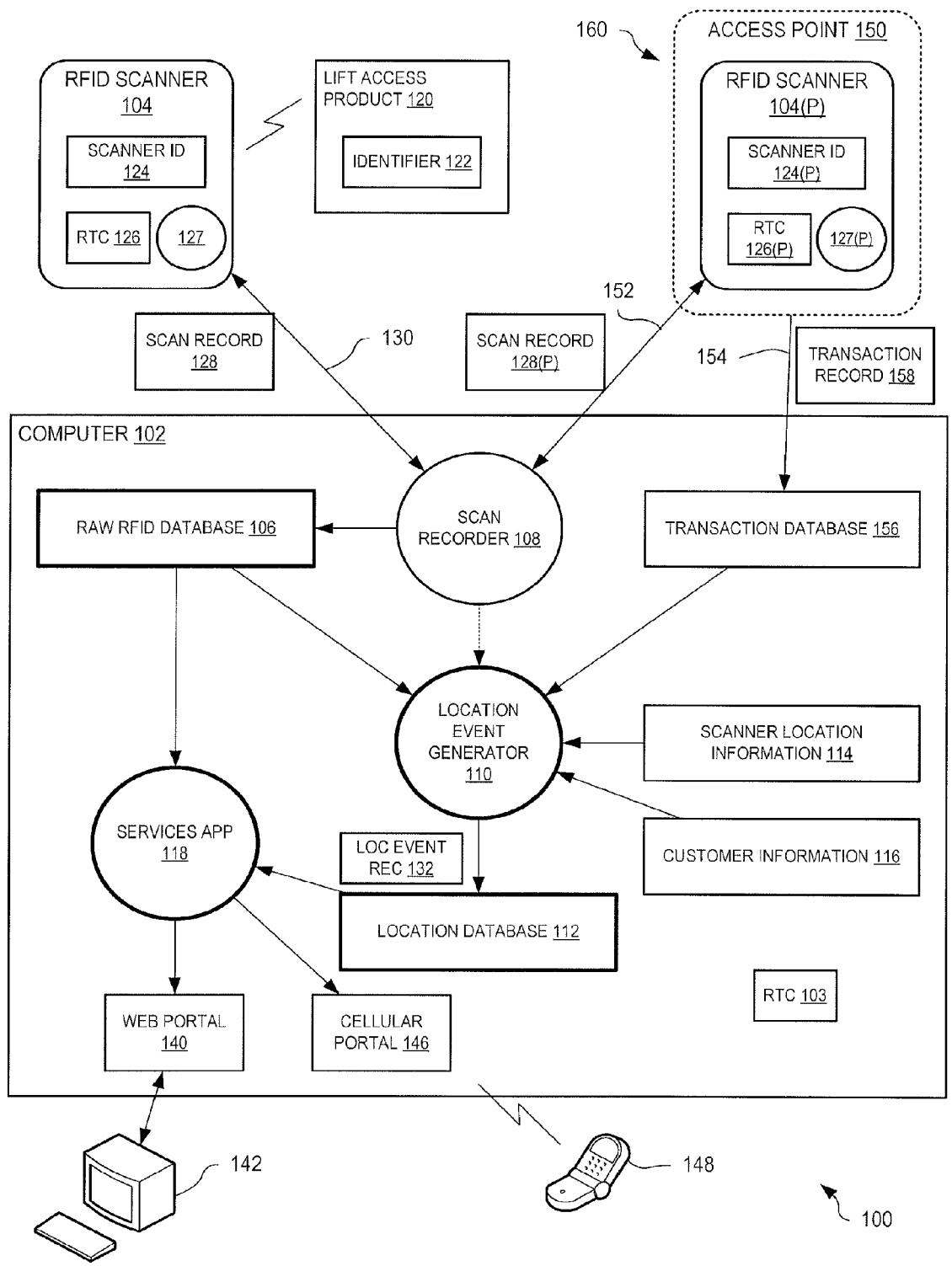
FIG. 1 shows one exemplary RFID skier monitoring system.

FIG. 1 shows one exemplary RFID skier monitoring system 100. System 100 is shown with a computer 102 in communication with two RFID scanners 104 and 104(P). Although system 100 is shown with two RFID scanners 104 for clarity of illustration, system 100 may include more or fewer RFID scanners without departing from the scope hereof. Computer 102 has a raw RFID database 106, a scan recorder 108, a location event generator 110, a location database 112 and a services application 118. Each RFID scanner 104 includes a unique scanner identifier 124 and a real time clock (RTC) 126 that maintains real time within RFID scanner 104. RTC 126 is synchronized with an RTC 103 within computer 102. A lift access product 120 has a unique identifier 122 that may be read by RFID scanner 104 when lift access product 120 is in range of RFID scanner 104. That is, identifier 122 is stored within an RFID tag that is readable by RFID scanner 104. Lift access product 120 is shown in further detail in FIG. 7, and may comprise a high frequency (HF) RFID tag 706, an ultra high frequency (UHF) RFID tag 702 and a bar code 720. HF RFID tags are preferred for memory and security features, and UHF RFID tags are preferred for their operational range. Thus, by including both HF and UHF RFID tags within lift access product 120, superior functionality can be obtained over instances when only one or the other RFID tag type is used. Accordingly, RFID scanner 104 may include a HF RFID tag scanner and an UHF RFID tag scanner. As described with respect to FIG. 7, lift access product 120 may also include a barcode, thereby making lift access product 120 compatible with a range of scanning devices typically used within ski resorts. Hereinafter, the term RFID tag may refer to one or both of the HF RFID tag and the UHF RFID tag.

In one example of operation, as lift access product 120 comes within reading range of RFID scanner 104, RFID scanner 104 reads identifier 122 and creates a scan record 128 that includes an identifier (e.g., identifier 122), a scanner identifier (e.g., scanner identifier 124), and a time stamp based upon RTC 126. Scan record 128 is sent to computer 102 via data path 130. In one example, scan record 128 is transmitted to computer 102 as soon as it is generated by RFID scanner 104. In another example, RFID scanner 104 sends generated scan records (e.g., scan record 128) to computer 102 in batches, where a batch is sent every sixty seconds and contains scan records generated during that sixty second period. Data path 130 may include one or more wireless, optical, and wired connections. Scan record 128 is received by scan recorder 108 and stored within raw RFID database 106.

In an embodiment, scan recorder 108 sends scan record 128 to location event generator 110 for further processing. In another embodiment, scan recorder 108 notifies location event generator 110 of the arrival of scan record 128 and location event generator 110 retrieves scan record 128 from raw RFID database 106. In another embodiment, location event generator 110 periodically scans raw RFID database 106 for unprocessed scan records. Location event generator 110 processes scan record 128 to generate a location event record 132, based upon scanner location information 114 and customer information 116, and stores location event record 132 in location database 112. Location event record 132 includes customer identification, location information and a time stamp for that location event. For example, location event generator 110 matches scanner identifier 124 of scan record 128 with a scanner location record within scanner location information 114 to determine a location of location event record 132; location event generator 110 matches identifier 122 of scan record 128 with customer information 116 to associate location event record 132 with a registered customer. Thus, location database 112 contains location event records (e.g., location event record 132) that define a recorded occurrence of lift access product 120 near the location of RFID scanner 104. System 100 typically includes many RFID scanners 104 (see for example FIGS. 2), and therefore can track movement of customers based upon locations of RFID scanners 104.

By locating RFID scanner 104 at a ski lift (e.g., at the ski lift loading point), system 100 may identify customers using the ski lift by scanning their lift access products to read the associated identifier 122.

Figure 2:
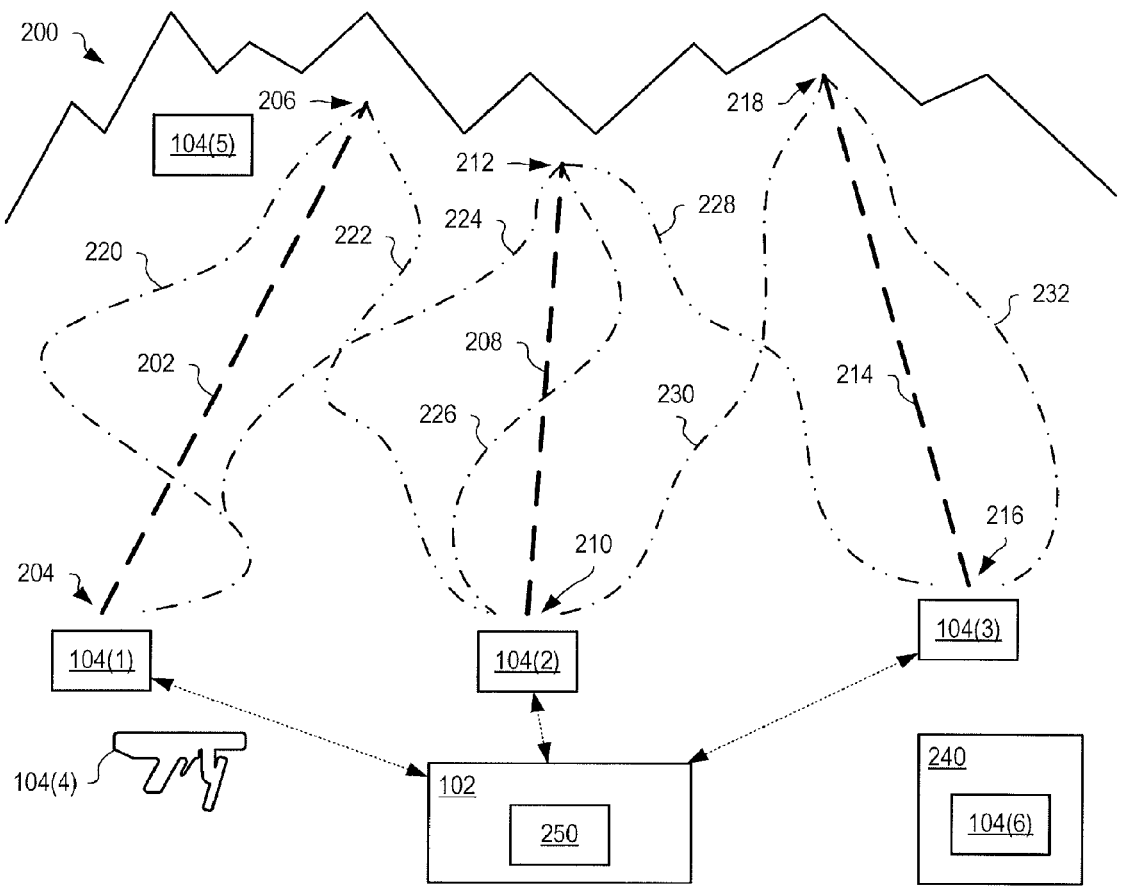
FIG. 2 is a schematic showing the system of FIG. 1 deployed at an exemplary ski resort.

FIG. 2 is a schematic of system 100 deployed at an exemplary ski resort 200 that has three ski lifts 202, 208, and 214, each having an RFID scanner 104(1), 104(2), and 104(3) located at a loading point 204, 210, and 216 of the ski lift, respectively. Ski resort 200 may have more of fewer ski lifts without departing from the scope hereof From a drop point 206 of lift 202, two trails 220 and 222 are accessible; from a drop point 212 of lift 208, three trails 224, 226, and 228 arc accessible; and from a drop point 218 of lift 214, two trails 230 and 232 are accessible. Each lift may access more or fewer trails without departing from the scope hereof. Since RFID scanners 104 are mounted to lift structures, base area grooming (i.e., the preparation of the snow by a snow cat or other similar devices) practices are unaffected.

Figure 3:
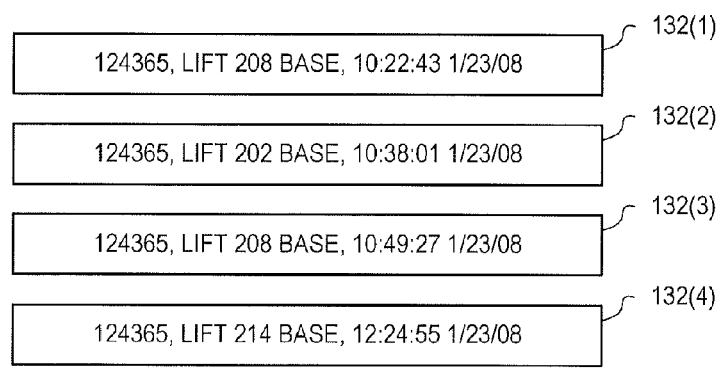
FIG. 3 shows four exemplary location event records for a customer identifier of "124365".

FIG. 3 shows four exemplary location event records 132 (1)-132(4) selected by services application 118 as identified by a customer identifier "124365" for the 23$^{rd}$ day of January, 2008. For example, a user may use a terminal 142 (e.g., a web browser running on a personal computer, a resort on-slope kiosk (e.g., kiosk associated with RFID scanner 104(6), FIG. 2), etc.) to interact with services application 118 via a web portal 140 and request services application 118 to query location database 112 and retrieve all location event records associated with customer identifier "124365" (e.g., the customer number of the user). In the example of FIG. 3, location event record 132(1) indicates that customer 124365 boarded ski lift 208 at time 10:22:43 on Jan. 23, 2008; location event record 132(2) indicates that customer 124365 boarded ski lift 202 at time 10:38:01; location event record 132(3) indicated that customer 124365 boarded ski lift 208 at time 10:49:27; and location event record 132(4) indicated that customer 124365 boarded ski lift 214 at 12:24:55. System 100 stores location event records 132 for each customer carrying a lift access product (e.g., lift access product 120); FIG. 3 shows location event records 132(1)-132(4) for customer number "124365."

Scanner location information 114 may include additional information, for each location, such as: trails (and levels) accessible directly from the location; trails (and levels) providing access to the location; resort zone(s) serviced by the location; vertical feet that the lift at the location ascends; other characteristics such as terrain types (e.g., mogul/bump runs, groomed runs, tree skiing, bowl skiing, terrain park, etc.) accessible from the location; and distance from each base portal (e.g., ski area entry point). Thus, in the example of FIG. 2, location of RFID scanner 104(1) may be associated by scanner location information 114 with drop point 206, trails 220 and 222, and lift 208. Similarly, location of RFID scanner 104(2) may be associated with drop point 212, trails 224, 226, and 228, and ski lifts 202 and 214. Similarly again, location of RFID scanner 104(3) may be associated with drop point 218, trails 230 and 232, and ski lift 208. As RFID scanners 104 scan lift access products 120, scan records are sent to computer 102 for processing as described above.

Other information may be collected by computer 102 and processed to generate location event records. As shown in FIG. 1, an access point 150 has an RFID scanner 104(P) configured with a scanner identifier 124(P), a RTC 126(P) and application software 127(P). Access point 150 may represent one of a point of sale (POS) system, a parking access system, a room key system, vending machines, member clubs, ski lockers, spa and pool areas, etc.

Where access point 150 is a POS system, RFID scanner 104(P) may read identifier 122 of lift access product 120 to perform a financial transaction. Lift access product 120 may operate as a contact-less payment card for use at POS systems within the resort, where the POS system identifies the customer based upon identifier 122, thereby transacting money with the customer's resort account. Lift access product 120 may also operate as a stored value card and used for payment at access point 150 (i.e., at a POS within the resort), wherein a financial balance and transaction identifiers may be written to the RFID tag. Access point 150 may then generate and send, via data path 154, a transaction record 158 to computer 102 for storage within a transaction database 156. Data path 154 is for example an 802.11a WiFi network operating to provide connectivity between access point 150 and computer 102. Other kinds of connectivity may be used without departing from the scope hereof. The financial balance of lift access product 120 may be increased at kiosks throughout the resort through a credit card transaction for example.

In an embodiment, RFID scanner 104(P) generates and sends a scan record 128(P) to scan recorder 108 for further processing. In an alternate embodiment, location event generator 110 processes information of transaction database 156 to generate location event records 132 for storage within location database 112 based upon POS transactions stored therein. For example, a correlation between a customer ID used for POS transactions (i.e., stored within transaction database 156) and identifier 122 of lift access product 120 may be stored within customer information 116. Further, even when identifier 122 is not scanned for a POS transaction, information within customer information 116 may allow generation of location event record 132 based upon other transacted information.

Where access point 150 controls access to a parking garage, RFID scanner 104(P) may control operation of one or more automatic barriers to prevent unauthorized use of the parking garage. Upon access to the parking garage, access point 150 and/or RFID scanner 104(P) may generate and send one or more of scan record 128(P) and location event record 132 to computer 102 where an appropriate location event record 132 is generated and stored.

Where access point 150 controls access to a room, RFID scanner 104(P) may operate to unlock a door to the room based upon reading identifier 122 of lift access product 120. As appreciated, operating range of the associated RFID scanner may be selected to provide the appropriate control. Access point 150 and/or RFID scanner 104(P) may generate and send one or more of scan record 128(P) and location event record 132 to computer 102 where an appropriate location event record 132 is generated and stored.

Computer 102 may include other databases for storing information gathered by the ski resort. For example, computer 102 may store one or more of weather conditions, snow conditions, grooming conditions, and the terrain open to the public.

Authentication Kiosk

Access point 150 may also represent a self-serve kiosk 160 for authenticating lift access products. Kiosk 160 may be located away from lift lines and ticket sales to avoid congestion. System 100 may be configured with many kiosks 160 that are strategically located throughout the ski resort. Kiosks 160 may be deployed at common gathering locations such as the top and bottoms of lifts. Customers may use kiosk 160 to check their ski area account, view their statistics and check for any personalized messages they might have received from members of their party or from the resort.

In operation, as a customer approaches kiosk 160, kiosk 160 automatically detects the customer's lift access product 120. The operational range of the RFID scanner associated with kiosk 160 may be selected to provide optimal usability of kiosk 160 by customers. Kiosk 160 may then display any services (e.g., group, messages, etc.) for attention of the customer. The customer may then log in to the kiosk (for example by using lift access product 120 at short range—1 inch (2.54 centimeters)—of the associated RFID scanner of kiosk 160). That is, the UHF RFID tag of the customer's lift access product 120 may be detected at a range of 10 feet (3.048 meters), but login only occurs upon close proximity scanning of the lift access product's HF RFID tag.

Upon log in, kiosk 160 may display the customer's name and home page that shows a summary of the customer's on-slope statistics, messages and the last known location of other members of the customer's group, if the customer is associated with a group.

In an exemplary embodiment, kiosk 160 may include the following functionality:

Display of General Statistics

When no customer is within RFID scan range of the kiosk, the kiosk displays general statistics about the associated lift, such as average lift ascent time and average descent time of skiers and boarders using the lift, and may display other on-slope statistics, such as average wait times at on-mountain restaurants.

Automatic Detection

Kiosk 160 detects a customer (by scanning the customer's lift access product 120) from a short distance away and automatically displays messages (or an indication of at least one new message) intended for that customer. Where multiple customers are detected, messages may be displayed concurrently, or in turn, for each detected customer.

Display of Name and Statistics

After a customer is detected and logs in using their lift access product 120 at close proximity, kiosk 160 displays the customer's name and shows the customer's personal statistics, messages, and location of friends. The displayed statistics may include number of runs today, number vertical feet today, average lift time, average descent time, and most recent descent time. Additional features may be added to post statistics to certain Internet websites. Kiosk 160 may also display customer loyalty points that may be redeemed for gifts and services.

Pass Activation

When customers first arrive at the ski resort for the day (or the season), the customer may activate their lift access product 120 at kiosk 160 without having to check in at a ticket counter. Kiosk 160 may also include a biometric reader/scanner to verify the customer's identity, as such the customer may need to remove one or more items of clothing, such as a glove for fingerprint scanning, glasses/goggles for iris scanning, etc. Once verified, the lift access product is activated for use for the day (or optionally the season if so determined by the ski resort operators).

Contact with Friends

A customer may look up friends that are in his/her group and find out the most recent location and time they were recorded by system 100. For example, the customer may select a particular friend from their group displayed at kiosk 160, whereupon kiosk 160 may show a particular ski lift the friend is currently riding, or may show a time and lift last ridden by the friend. The customer may add one or more friends to their group when these friends are also identified by (i.e., when these friends are within RFID scan range of) kiosk 160. In one example of operation, kiosk 160 detects a friend's lift access product 120 and displays the friend's thumbnail picture and name, thereby allowing the customer to add this friend to the group by simple selection.

Send Messages

A customer, once logged into kiosk 160, may select a friend in the customer's group and send a text message to that friend by typing the message at the kiosk. The message is then stored until delivered to the friend, when the friend is detected as proximate to, a message display board and/or a kiosk. Customers may also provide feedback to the resort by entering the message at kiosk 160.

Read Messages

Customers may read messages sent to them by friends and/or the resort. By approaching kiosk 160, the customer sees an indication (e.g., a count) of waiting messages. The customer may then login to the kiosk (i.e., by approaching closely) and retrieve messages. The resort may communicate with the customer, such as with regular updates on the status of a child in day care, and/or weather and traffic reports, if so requested by the customer (e.g., by specifying message types for delivery within a customer profile during online account interaction and/or kiosk interaction. These messages may include context sensitive messages (e.g., messages based upon the customer's current location) and special offers, such as recommending runs commensurate with the type of runs that skier has used in the past, and/or offering discounts at the nearest bar and/or restaurant.

Redemption of Awards

Kiosk 160 may have an awards screen where users may redeem earned loyalty points for goods and/or services. Upon selection of a reward and/or goods, kiosk 160 may credit the customer's account and/or print out coupons. For example, rewards could include a free massage at the spa, or a discount at a restaurant. Kiosk 160 may also allow customers to enter competitions, such as for the most vertical feet skied for the day (which may provide an incentive to avoid heavily trafficked runs which could help load balance skiing traffic over the ski area) and provide statistics as to customer's current status/rank in the competitions.

Automatic Logout

When the customer leaves proximity of kiosk 160, kiosk 160 loses contact with the customer's lift access product 120 and the user is automatically logged out. Alternatively, a customer may interactively logout of kiosk 160 by pressing a button. Kiosk 160 may indicate logout by displaying a logout screen, or by switching back to a general information display screen.

Distributed Functionality

Figure 4:
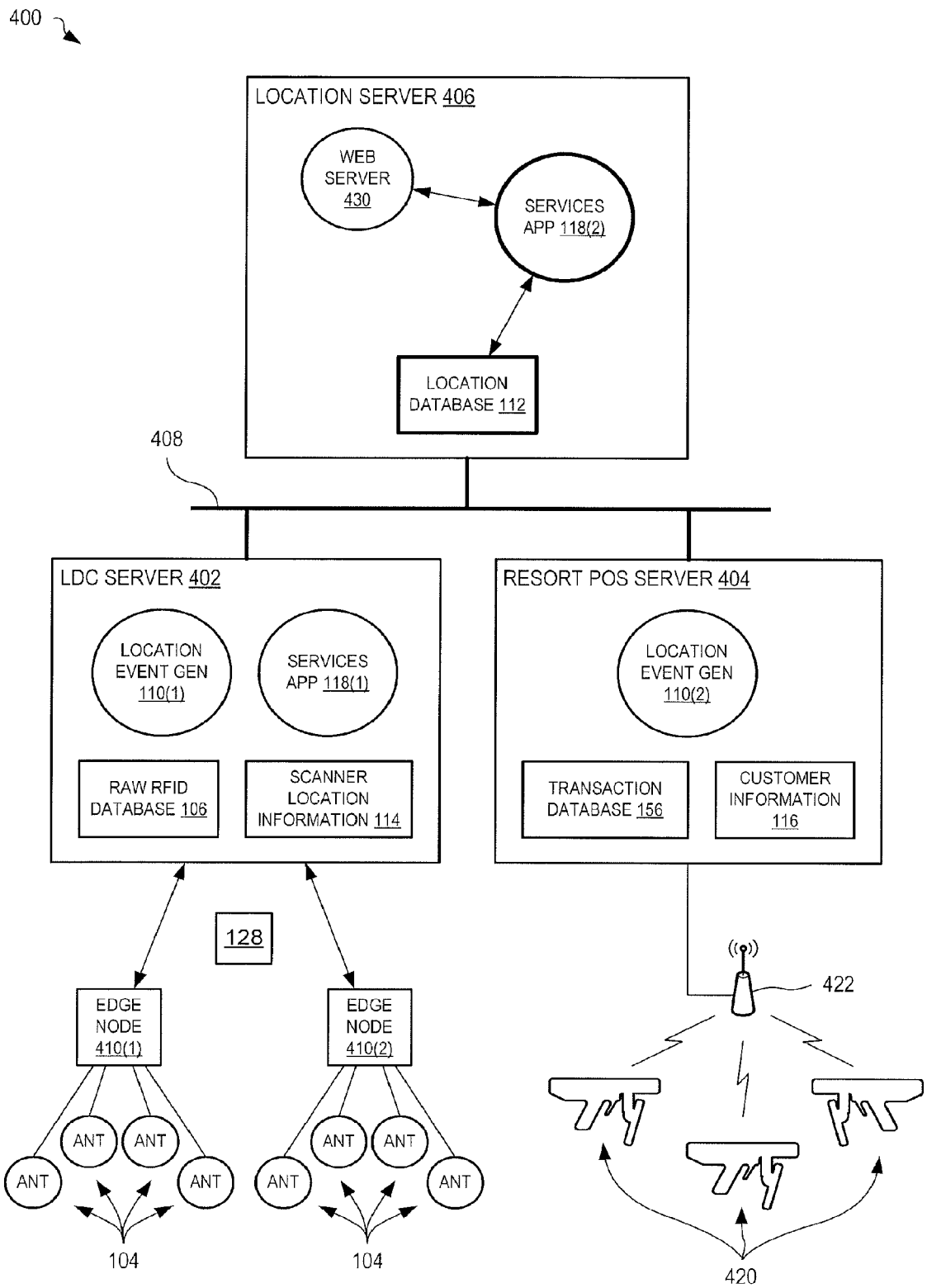
FIG. 4 shows one exemplary RFID skier monitoring system configured with three servers.

FIG. 4 shows one exemplary RFID skier monitoring system 400 comprising three servers. That is, functionality of computer 102 is provided by three communicatively connected and cooperating servers: a lift data collection (LDC) server 402, a resort POS server 404, and a location server 406. The use of servers 402, 404, and 406 may facilitate deployment of system 100 within a ski resort.

LDC server 402 operates to collect, store, and process raw RFID information, such as scan record 128.

In particular, as shown in system 400, HH RFID scanners 420 need not connect to the same server as RFID scanners 104.

Guest Benefits

The use of RFID tags allows lift access product 120 to be scanned through clothing, thereby not requiring the customer to present the media for scanning. Since media presentation often entails removing gloves and opening jackets, the customer is less inconvenienced.

Figure 5:
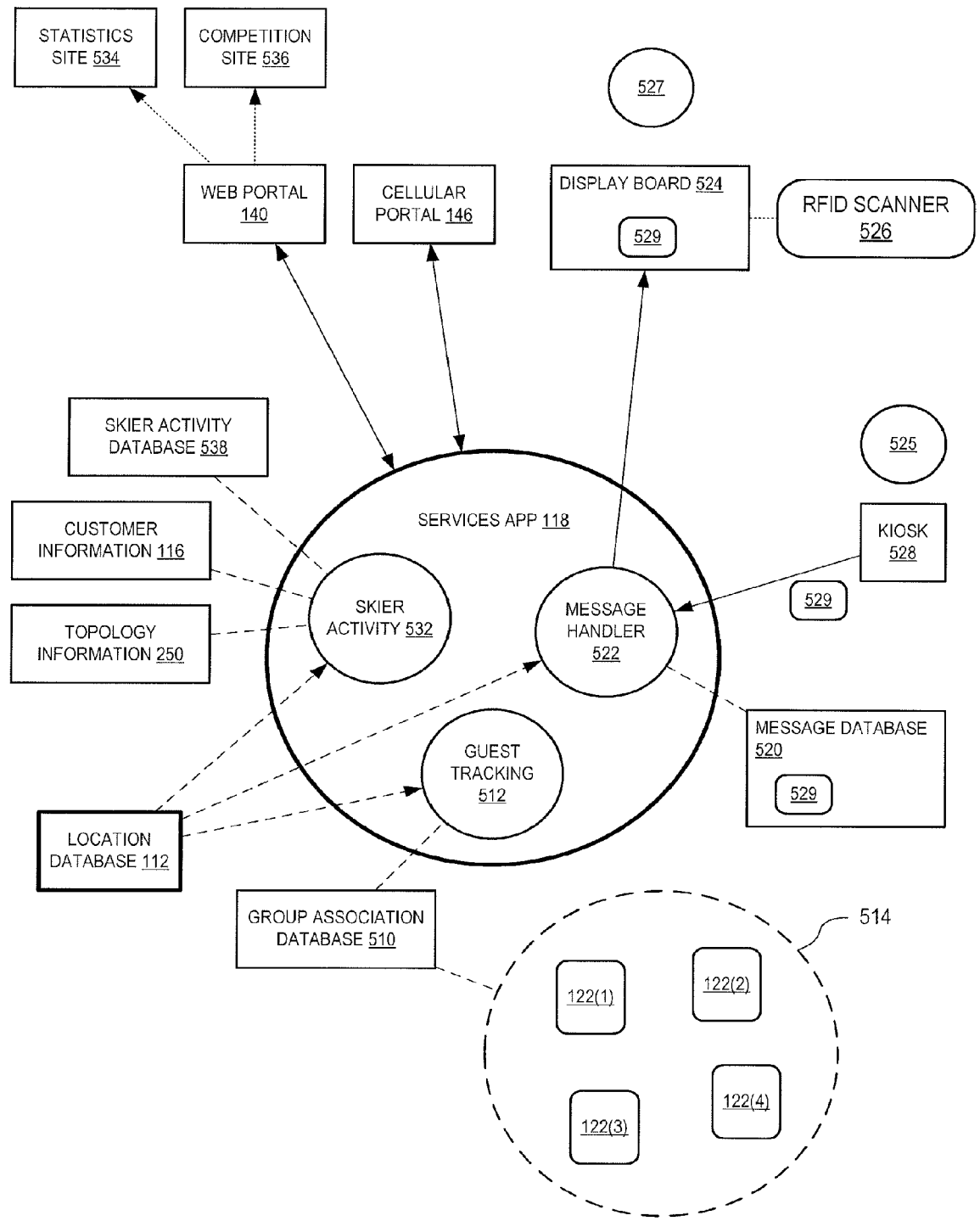
FIG. 5 shows a services application of the system of FIG. 1.

FIG. 5 shows location server 406 of FIG. 4 in further detail. A guest tracking service within services application 118 utilizes location event records 132 within location database 112 to provide tracking information to other members of grouped guests. A group 514 may be formed by associating identifiers 122 of each member of the group together. For example, if a first customer has an identifier 122(1), and three friends have identifiers 122(2), 122(3), and 122(4), group 514 is formed with identifiers 122(1), 122(2), 122(3), and 122(4), through association within group association database 510. Group 514 may be formed through use of a web browser, an on-mountain kiosk, and/or resort guest services. Services application 118 may store a unique group identifier of each formed group in association with each identifier 122 of members of the group within group association database 510, thereby forming the group association. Group 514 may be identified by searching group association database 510 for groups containing a given identifier 122. It is therefore not necessary for customers to identify groups through use of a unique identifier other than their own identifier 122. A guest tracking module 512 of services application 118 determines members of group 514 based upon any one of identifiers 122(1), 122(2), 122(3), and 122(4). Other methods of identifying and storing groups within a database may be used without departing from the scope hereof.

Once a group (e.g., group 514) is identified, guest tracking module 512 may be invoked to search location database 112 and retrieve last known locations of each group member. In one example of operation, first family member interacts with an on-slope kiosk to form a group of all family members. Upon interaction with the kiosk, the first family member is identified. Selecting a 'create new group' option on the kiosk forms a new group comprising the first family member. Other family members may then be added to the group by scanning their lift access products 120 at the kiosk.

Customers may also associate a cell phone 148 with their lift access product 120 through use of a kiosk, web browser, etc. Thus enabling cellular portal 146 to identify the customer should they call or text the cell portal from that cell phone. Customers may then use cell phones (e.g., cell phone 148) to access information of system 100 via cellular portal 146 without the need to enter their identifier 122 number each time.

Continuing with the example, if the family members become separated, the first family member may request location information of associated group members by texting a location request to cellular portal 146 from their cell phone (e.g., cell phone 148). Upon receipt of this text message via cellular portal 146, services application 118 may first determine the identifier 122 of the customer associated with the sending cell phone (i.e., using the sending cell phone number) and then identify other members of the associated group (e.g., group 514). For each of the identified members, services application 118 may utilize guest tracking module 512 to determine the last recorded location and time known for that member. Services application 118 may then send one or more text messages containing the latest location and time information for each other member of the group to the requesting cellular phone.

In another example, one member of the family group utilizes an on-slope kiosk to request the latest recorded location and time of other group members. The kiosk interacts with services application 118 and guest tracking module 512 to determine the latest recorded location event records for the identified group members and then displays the associated location and time information on the screen of the on-slope kiosk. Since the on-slope kiosk identifies the group by scanning the lift access product 120 of the interacting customer, the on-slope kiosk provides diverse operation without complicated input requirements from the customer.

On Mountain Messaging

Services application 118 also includes a message hander 522 that allows personal messages to be delivered to on-slope customers. For example, on-slope display boards may be used to deliver messages to customers when addressed customers are within viewing range of the display board. Where multiple customers are within range of the display board, messages for these detected customers may be displayed concurrently and/or scrolled across the display board.

Figure 17:
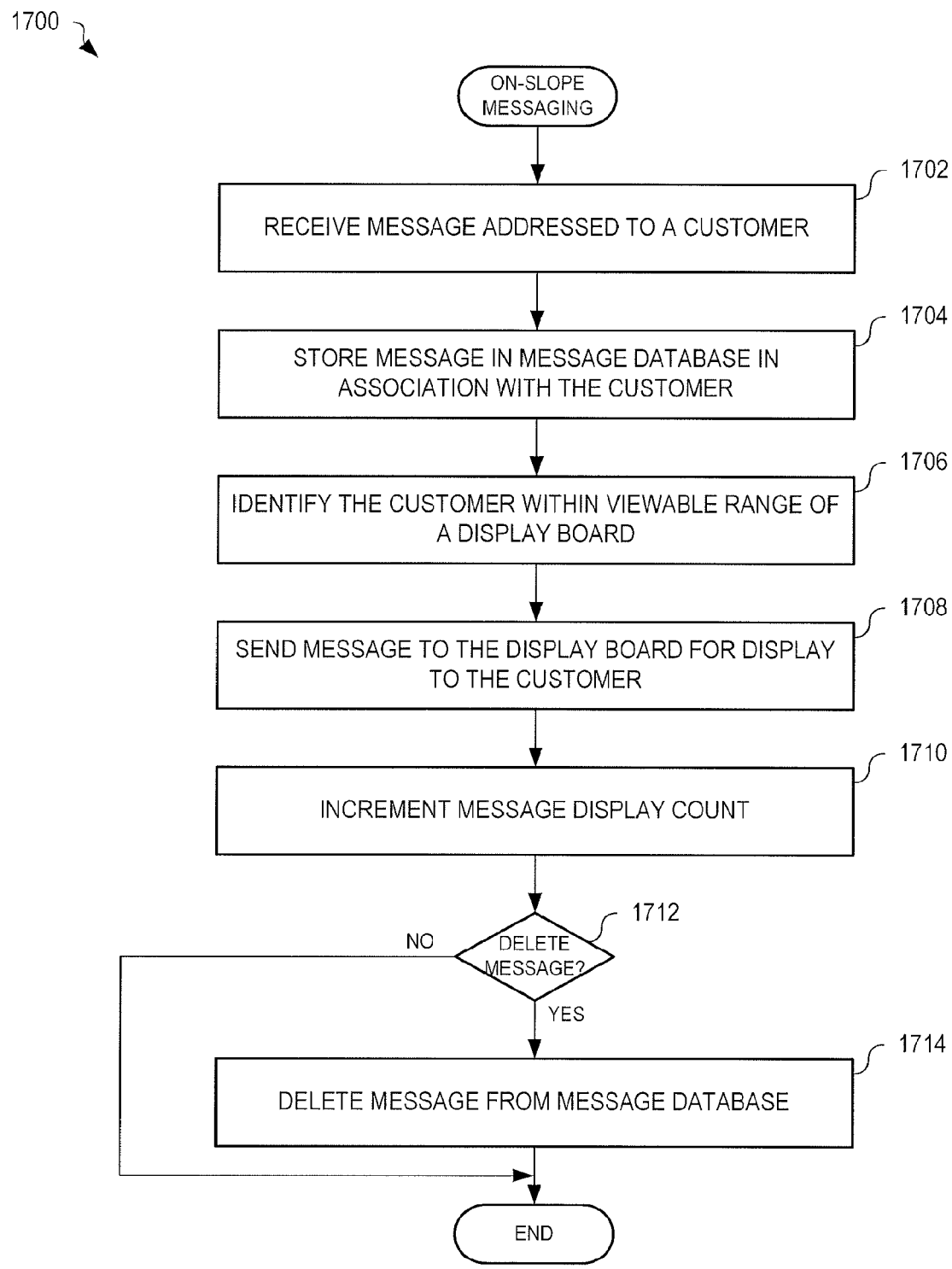
FIG. 17 is a flowchart illustrating one exemplary process for delivering on-slope messages, in an embodiment.

FIG. 17 is a flowchart illustrating one exemplary process 1700 for delivering on-slope messages. Process 1700 may be implemented within message hander 522. In step 1702, process 1700 receives a message addressed to a customer. In one example of step 1702, message handler 522 receives a message 529 from a first customer 525, using an on-slope kiosk 528, addressed to a second customer 527. In another example, message 529 is received from one of a cell phone (e.g., cell phone 148) and a web browser (e.g., web browser running on terminal 142). First customer 525, using on-slope kiosk 528, may select second customer 527 and enters message 529 for display to second customer 527. First customer 525 may identify second customer 527 by one of the customer's name, the customer nickname, and the customer's identifier number (i.e., identifier 122). Alternatively, first customer 525 may identify second customer 527 by selection the second customer from a list of customers defined within the group of first customer 525.

In step 1704, process 1700 stores the message in a message database in association with the customer. In one example of step 1704, message handler 522 stores message 529 within message database 520 with an association to second customer 527. In step 1706, process 1700 identifies the customer within viewable range of a display board. In one example of step 1706, an RFID scanner 526 is associated with an on-slope display board 524 and operates to identify (i.e., scan) lift access products 120 of customers within viewing range of display board 524. As second customer 527 approaches display board 524, RFID scanner 526 reads the identifier 122 of second customer 527, creates a scan record 128 which is sent to location event generator 110. Location event generator 110 generates a new location event record 132 and stores location event record 132 within location database 112. Message handler 522 processes location database 112 to identify new location records 132 that indicate that second customer 527 is within viewing range of display board 524. In step 1718, process 1700 sends the message to the display board for display to the customer. In one example of step 1708, message hander 522 sends message 529 to display board 524 for display to second customer 527. In step 1710, process 1700 increments a message display count for the message. In one example of step 1710, message hander 522 increments a count associated with message 529 within message database 520. Step 1712 is a decision. If, in step 1712, process 1700 determines that the message has been viewed, process 1700 terminates; otherwise process 1700 continues with step 1714. In step 1714, process 1700 deletes the message from the message database. In one example of steps 1712 and 1714, message hander 522 maintains a count of the number of times each message is displayed, and deleted the message after it has been displayed three times, thereby increasing the probability that the message has been read by the intended recipient.

In an embodiment, display board 524 is located at a ski lift base such that customer boarding the ski lift may read the display board and RFID scanner 526 represents one of RFID scanners 104 that operate to identify customers boarding the ski lift.

In an alternate embodiment, upon receipt of message 529, message hander 522 sends message 529 to display board 524 where it is stored locally until displayed or until the defined valid period of the message expires. The message may include identifier 122 of the customer to whom it should be displayed. In this embodiment, RFID scanner 526 scans identifier 122 of each customer within viewable range of display board 524 and sends the scanned identifier 122 to display board 524. Upon receiving the scanned identifier, display board 524 searches its local memory to determine whether there are any messages for the identifier customer. Any messages associated with the identified customer are displayed on display board 524. Thus, after receiving messages for display (e.g., message 529), display board 524 and RFID scanner 526 operate independently of services application 118 and computer 102 to display messages to identified customers.

Skier Activity Portal

Services application 118 may also include skier activity module 532 that allows a customer to view their activity at the ski resort. Skier activity module 532 retrieves location event records 132 from location database 112 and processes them to determine customer activity for a customer selected period.

Skier activity module 532 and web portal 140 cooperate to provide a statistics web site 534 where customers are able to access their personal activity statistics based upon location event records 132 captured during their activity at the resort. For example, customers will be able to log in to the web site and review statistics of the number of days skied at each resort. For each day, the customer may review weather, snow, and grooming conditions, amount of vertical feet skied by mountain zone and mountain statistics, such as the total number of skiers on mountain that day by mountain zone, the average vertical feet skied by guests that day, broken down by mountain zone and demographic. Customers may download their statistics and publish them to their social networking web sites, for example. Customers may view a trail map of the ski resort populated with lifts ridden with date-time stamps and lift progression. The trail map may be interactive, allowing the customer to identify and record the trails ridden from each lift, thereby allowing the customer to recreate their on-mountain experience.

Figure 18:
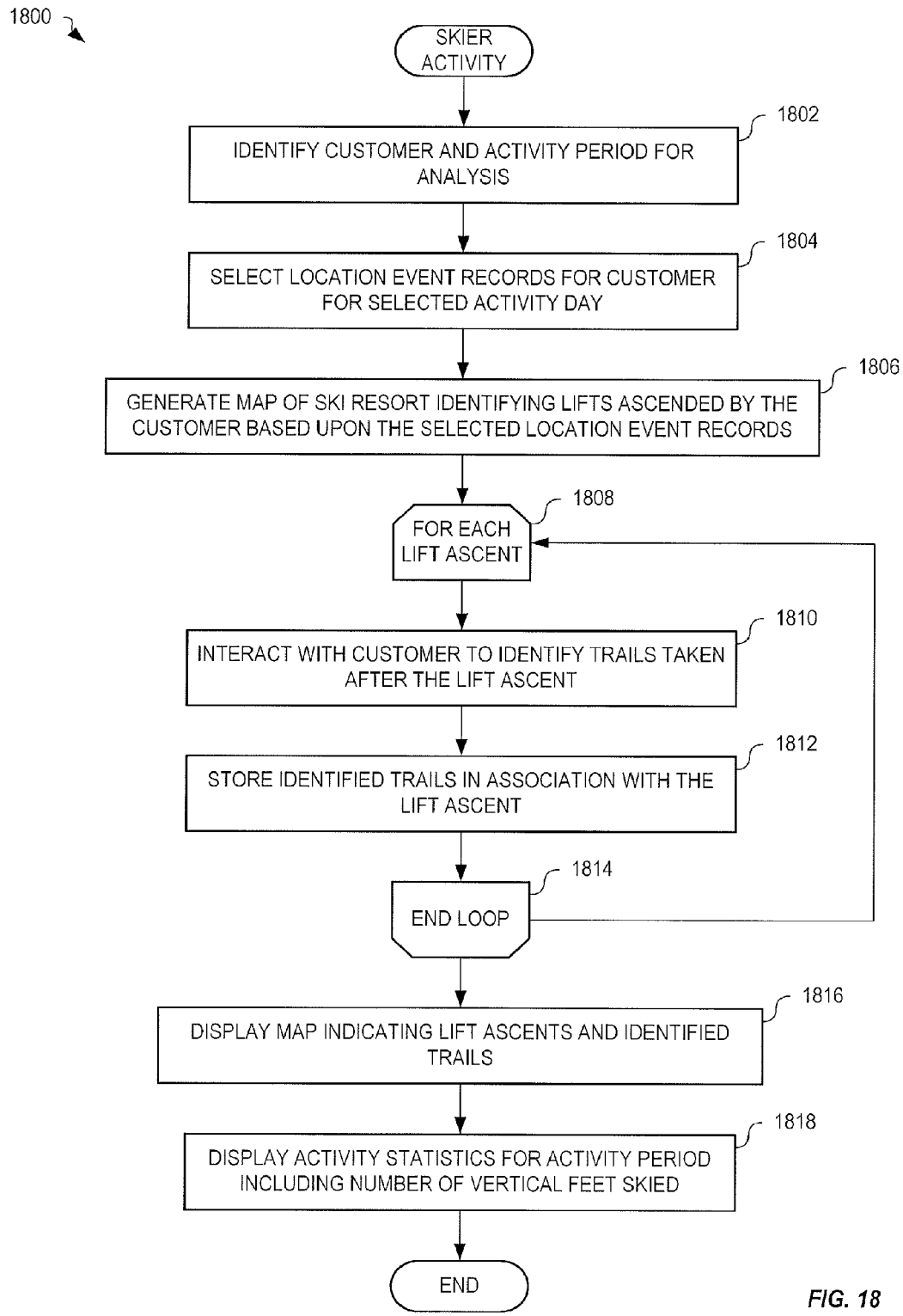
FIG. 18 is a flowchart illustrating one exemplary process for displaying skier activity, in an embodiment.

FIG. 18 is a flowchart illustrating one exemplary process 1800 for displaying skier activity. Process 1800 is implemented within skier activity module 532, for example. In step 1802, process 1800 identifies the customer and the activity period for analysis. In one example of step 1802, a customer logs into statistics web site 534 to view statistical information accumulated from a selected period of skiing. The log in process identifies the customer based upon one or more of a user name and password associated with identifier 122 of the customer's lift access product 120. The customer then selects a period based upon information recorded by system 100 for that customer. In another example of step 1802, as the customer approaches an on-slope kiosk (e.g., a kiosk 240, FIG. 2), the kiosk automatically identifies the customer, and upon close scan of the customer's lift access product 120, logs the customer into statistics web site 534 and selects the current day as the activity period.

In step 1804, process 1800 selects location event records for the customer identified in step 1804 and for a selected activity period. In one example of step 1804, skier activity module 532 selects location event records 132 associated with the identified customer for the selected activity period. In step 1806, process 1800 generates a map of the ski resort identifying lifts ascended by the identified customer based upon the selected location event records. In one example of step 1806, skier activity module 532 identifies each lift ascended by the customer based upon location event records 132 resulting from scan records 128 captured at lift boarding areas (e.g., lift boarding area 2004, FIG. 20). Skier activity module 532 then generates a map of the ski resort and indicates lift boarding times of the customer at each ski lift.

Steps 1808 through 1814 form a loop that repeats to allow the customer to interactively identify trails skied after ascending each lift. Steps 1808 through 1814 repeat for each identified lift ascent, based upon selected location event records of step 1804. In step 1810, process 1800 interacts with the customer to identify trails taken from the lift ascent of step 1808. In one example of step 1808, skier activity module 532 highlights the lift ascent of step 1808 on the displayed map and interacts with the identified customer to select one or more trails that are accessible from that lift ascent, based upon topology information 250. In one embodiment, skier activity module 532 validates selected trails and highlights improbable selections (e.g., where a customer has selected a trail that is not easily accessible from the specified lift). In step 1812, process 1800 stores the identified trails in association with the customer and the lift ascent of step 1808. In one example of step 1812, skier activity module 532 stores identified trails of step 1810 within a skier activity database 538 in association with the identified customer of step 1802 and the lift ascent of step 1808. Steps 1808 through 1814 repeat for each lift ascent made by the identified customer for the selected activity period unless terminated by the customer.

In step 1816, process 1800 displays a map of the ski resort indicating lift ascents and identified trails. In one example of step 1816, skier activity module 532 displays a map of the ski resort, identifying ski lifts ascended and identified trails, via web portal 140 and statistics web site 534. In step 1818, process 1800 displays activity statistics for the identified customer and selected activity period, including a number of vertical feet skied during the selected period. In one example of step 1818, skier activity module 532 sums the vertical feet of each lift ascent of step 1808 for display to the customer as a total vertical feet skied statistic, counts the number of lift ascents for display as a lifts ridden statistic, and determines a vertical feet per minute average based upon the total vertical feet skied statistic and the selected activity period for display as a vertical feet per minute statistic. Skier activity module 532 then displays these determined statistics to the customer via web portal 140 and statistics web site 534.

Web portal 140 may also allow customers to "publish" their vertical feet statistics to a competition web site 536 and optionally enter one or more contests by resort, by zone, by demographic, and/or across multiple resorts. Thus, the customer may view their ranking versus their friends, family, and guests in similar demographics. Where the customer is part of a defined group (e.g., group 514), other members of that group may access determined statistics of each member of the group. For example, these statistics may allow for friendly competitions and rankings for selected periods and for statistics for total vertical feet skied, number of days skied, resorts zones skied, multiple resort statistics, etc.

On-Slope Photographer Customer Tracking

Ski resorts often have on-slope photographers (sharpshooters) that capture images of customers in the hope that customers will buy the images when they have finished skiing. Typically this requires that the customer visit a ski lodge or other location at the resort base to identify and purchase the images from the photographer. Where the customer forgets to visit the photographer, the images are typically erased and the photographer earns no money.

By using an RFID scanner (e.g., RFID scanner 104) to identify the customer prior to and after images are captured of the customer, the photographer may contact the customer through the resort contact information and/or web site. In one example, the photographer may email low resolution and/or watermarked images to the customer with a link to a web site operated by the photographer where the customer may purchase the images. In another example, the photographer provides an indication within the resort's web site such that the customer is notified of the available pictures upon logging into and/or connecting to the resort web site.

In an embodiment, the photographer uses a handheld RFID scanner to read identifier 122 of customers he has photographed. In another embodiment, an RFID scanner is position at a marked location on the slope to capture identifiers 122 of potential customers. The photographer then captures images of customers passing through the marked location and associated an image identifier with the captured identifier of the customer.

To enhance customer information, additional on-slope locations may include RFID scanners to identify customers visiting those locations such that location event records may be stored of those visits. For example, terrain park features such as jumps, rails, half-pipes, may include RFID scanners that read identifier 122 and generate scan records as a customer rides the terrain park feature. These scan records, as previously described, are used to generate location event records that may be processed to display one or more runs made by the customer through the terrain park. For example, the customer may access a web page to view a detailed map of the terrain park where the customer's use of the features is marked with a date/time stamp and or feature use order. In an embodiment, points may be assigned to each feature such that customers may accumulate points as a measure of feature usage. Such information may then be shared, at the customer's discretion, across customer groups.

Mountain Operations

Figure 6:
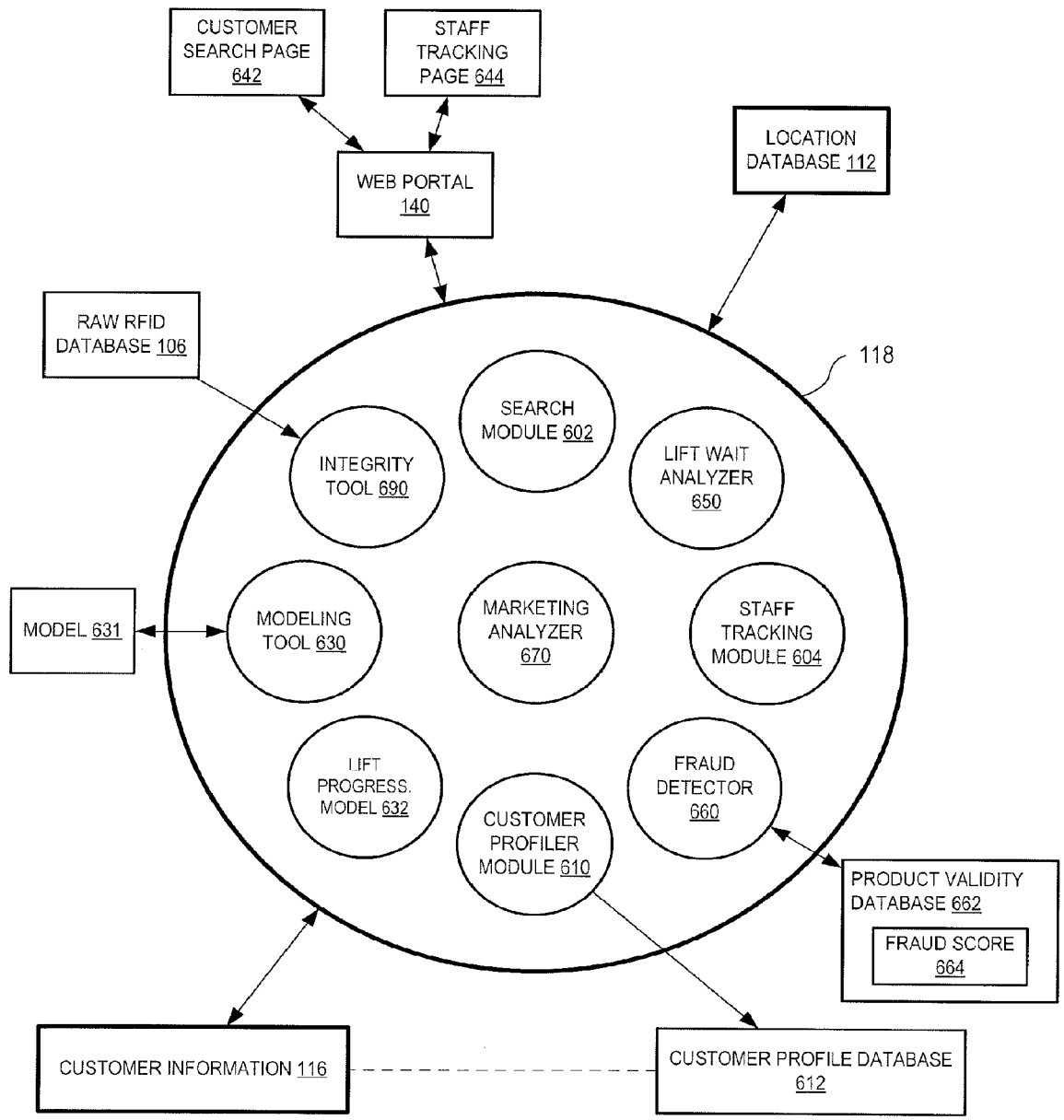
FIG. 6 shows exemplary tools of the service application of FIG. 1.

FIG. 6 shows exemplary tools of services application 118 as used by ski resort staff (e.g., mountain operation staff, marketing, etc.).

System Integrity and Performance Monitoring

Services application 118 includes an integrity tool 690 that continually, and/or periodically, monitors operation and performance of system 100. In the embodiment shown in FIG. 4, integrity tool 690 is located within services application 118(1) of LDC server 402.

Integrity tool 690 processes scan records 128 of raw RFID database 106 to monitor performance of hardware and software components of system 100. Integrity tool 690 monitors scanning performance of each RFID scanner 104 by processing information of each scan record 128. In an embodiment, scan record 128 also includes operational data such as temperature, memory utilization, communication reliability, etc. Integrity tool 690 processes this operational data to identify any failing and failed components of system 100. For example, where communication reliability between RFID scanner 104 and computer 102 becomes unreliable, integrity tool 690 may alert operators to investigate and repair one or more intermediate communication devices and/or RFID scanners 104.

Integrity tool 690 may also identify anomalies in the scanned information that may be caused by component failure and/or poor configuration based upon location event records 132. In this case, integrity tool 690 may operate within services application 118(2) of FIG. 4 and process location event records 132 of location database 112.

Integrity tool 690 utilizes several assumptions about customer boarding scenarios at each ski lift. Using the example of FIG. 2, RFID scanner 104(1) scans lift access products 120 of skiers boarding ski lift 202 and a hand-held (HH) RFID scanner 104(4) is also used to scan and validate lift access products 120 of skiers intending to board ski lift 202. A first assumption is that, for a customer using ski lift 202, a location event record 132 from RFID scanner 104(1) and a location event record 132 from HH RFID scanner 104(4) may occur (and thus be received by computer 102) in any order. A second assumption is that multiple scan records 128 for the same lift access product 120 may occur for a single boarding of a customer. A third assumption is that duplicate scan records from a lift boarding area RFID scanner (e.g., RFID scanner 104(1)) are not desirable. If it takes fifteen minutes to board a lift, ride the lift to the top and ski down to the lift loading point, scan records for the same lift access product made by the RFID scanner at the lift boarding area within that time period are assumed to be duplicate and that the customer has not boarded the lift.

Thus, during normal operation, a scan record from a HH RFID scanner and a scan record from a boarding area RFID scanner occur close in time; the ordering of the scan records being unimportant.

Expected timing of received scan records varies as the length of the lift line varies and the lift boarding process changes. Changes to the lift boarding dynamics impact HH RFID scanners and boarding area RFID scanners differently.

In a first 'busy ski lift' scenario, a customer skies to the end of the lift line at ski lift 202 and their lift access product 120 is scanned by HH RFID scanner 104(4) as they enter the lift line. The customer then spends a few minutes moving toward the front of the lift line and then boards the ski lift where RFID scanner 104(1) scans their lift access product 120. In this first scenario, it is likely that HH RFID scanner 104(4) scans the customer's lift access product 120 several minutes before the same customer's lift access product 120 is scanned by RFID scanner 104(1).

In a second 'non-busy ski lift' scenario, a customer skis up to ski lift 202. Since there is no line for lift 202, HH RFID scanner 104(4) may be located nearer the loading area of lift 202 that in the case of the first scenario. Thus, the customer's lift access product is scanned by both HH RFID scanner 104(4) and RFID scanner 104(1) within a short period of time; the ordering of scan records resulting from these scans is not determinate. Adding to this complexity, even when the ski lift is busy, the behavior of Ski School and Singles lanes may be closer to behavior of the non-busy scenario, since their use may be restricted to fewer customers having different activity schedules.

Three periods may be considered when modeling lift line behavior: $\Delta t1$, $\Delta t2$, and $\Delta t3$. $\Delta t1$ is the maximum time between a lift access product 120 of a customer being scanned by RFID scanner 104(1) at the boarding area of lift 202 and the lift access product being scanned by HH RFID scanner 104(4) when lift 202 is not busy. $\Delta t1$ is defined as one minute, for example. $\Delta t2$ is the maximum time between a lift access product 120 of a customer being scanned by HH RFID scanner 104(4) and then being scanned by RFID scanner 104(1) at the boarding area of lift 202 when lift 202 is busy. $\Delta t2$ is defined as ten minutes, for example. $\Delta t3$ is defined as the minimum time required for a customer to ride the lift to the top and ski down to the lift base. $\Delta t3$ is defined as fifteen minutes, for example.

Figure 8:
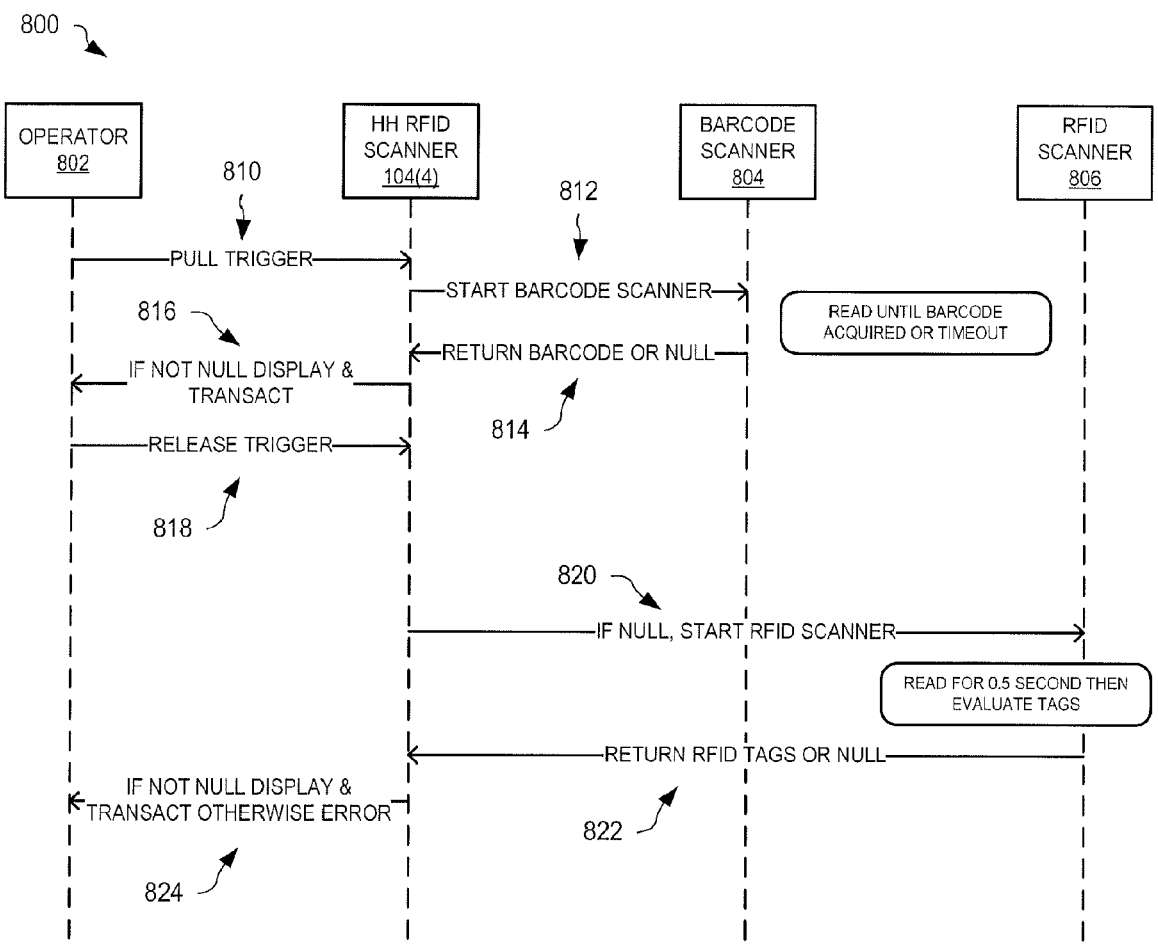
FIG. 8 is a flow diagram illustrating exemplary operation of a hand-held (HH) RFID scanner reading a lift access product.

FIG. 8 is a flow diagram illustrating exemplary operation of a HH RFID scanner (e.g., HH RFID scanner 104(4), FIG. 2) to read lift access product 120. An operator 802 pulls at step 810 a trigger on HH RFID scanner 104(4) while aiming HH RFID scanner 104(4) at a customer's lift access product 120. HH RFID scanner 104(4) starts scanning at step 812 for barcodes within range. If a barcode is read, a barcode is returned 814; otherwise a null is retuned after a timeout period (e.g., 1 minute) of if the operator releases at step 818 the trigger. If a barcode is read, the identity may be displayed and transacted upon 816. Operator 802 then releases at step 818 the trigger. At this point, the customer has been identified by reading the barcode on the lift access product 120.

If null is returned, indicating that no barcode was read, HH RFID scanner 104(4) initiates at step 820 an RFID scanning process. In one example, the scanning process operates for 0.5 seconds and all read RFIDs are then evaluated. If no RFID tags were read, a null is returned at step 822; otherwise a list of RFID tag identifiers are returned at step 822. If a single RFID tag identifier is returned, HH RFID scanner 104(4) displays and transacts at step 824 the identifier; if no or more than one RFID tag identifier is returned an error is displayed at step 824 requesting a re-read.

Thus, HH RFID scanner 104(4) may first try to scan the barcode and if that fails may try to read RFID tags of the lift access product. In one embodiment, HH RFID scanner 104(4) operates to read both barcode and associated RFID tags of each lift access product 120.

Once the lift access product 120 is identified, computer 102 may send an image and/or demographic information of the customer for display on a screen of HH RFID scanner 104(4), thereby allowing the operator to verify that the customer is using their own lift access product 120.

Figure 9:
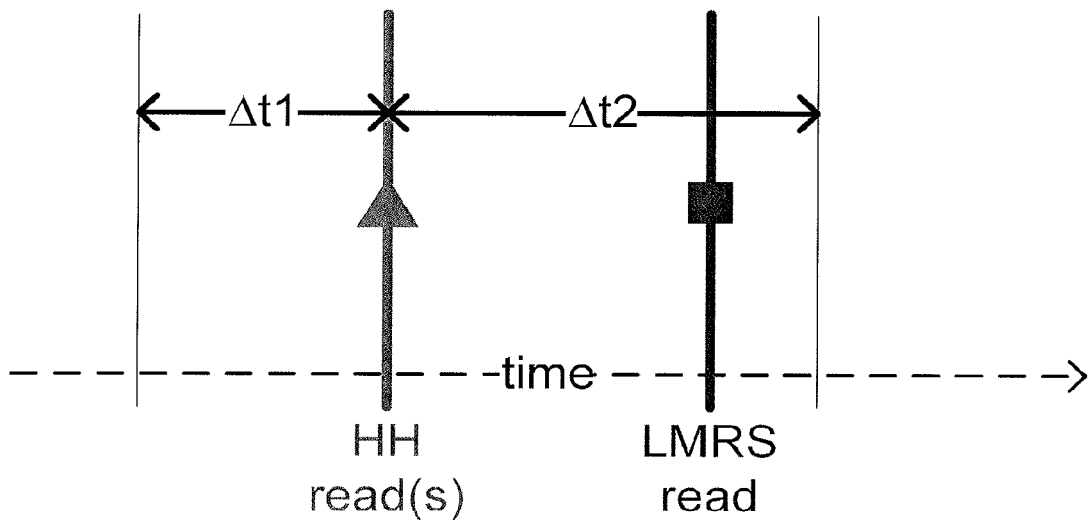
FIG. 9 shows successful pairing of scan records from an HH RFID scanner and a lift boarding area RFID scanner reading the same lift access product.
Figure 10:
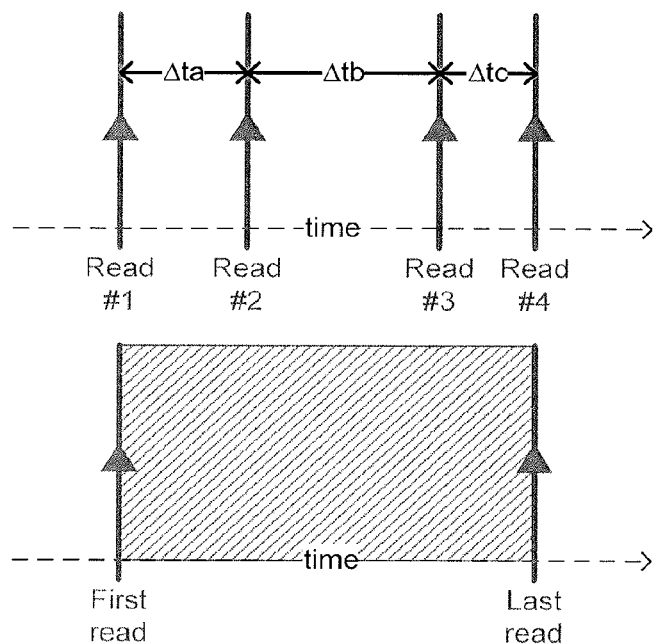
FIG. 10 shows grouping of four close-together HH RFID scanner scan records of the same lift access product into a single transaction.

FIG. 9 shows one exemplary scenario where HH RFID scanner 104(4) and lift boarding area RFID scanner 104(1) generate scan records from one lift access product 120. To consider both Busy and Not Busy scenarios, a success requires that the boarding area read event occurs less than $\Delta t1$ before the HH RFID scanner read event and less than Δt2 after the HH RFID scanner read event. Multiple HH RFID scanner reads during a single lift boarding are considered as a single read event to avoid an artificially high rate of hoarding area RFID scanner read events being flagged as missed. That is, multiple HH RFID scanner read events occurring in less than Δt2 may be grouped into a single transaction with a start time of the first HH RFID scanner read and an end time of the last HH RFID scanner read, as shown in FIG. 10 where four close-together HH RFID scanner reads of the same lift access product 120 are grouped into a single transaction. In this example, each of Δta, Δtb, and Δtc are each less than 1 minute.

Figure 11:
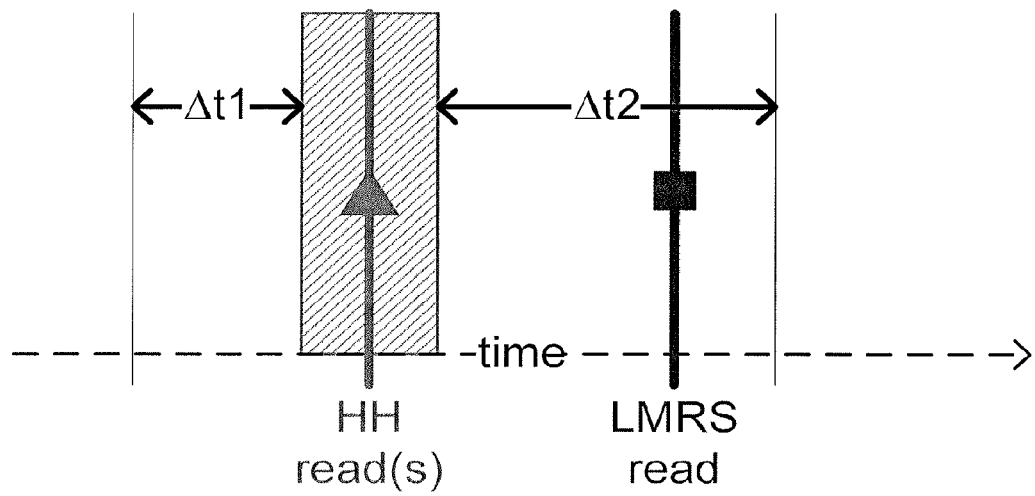
FIG. 11 shows successful pairing of two scan records read from the same lift access product by a boarding area RFID scanner and an HH RFID scanner.

FIG. 11 shows one scenario where a boarding area RFID scanner reads a lift access product within Δt2 of a HH RFID scanner reading the lift access product.

Figure 12:
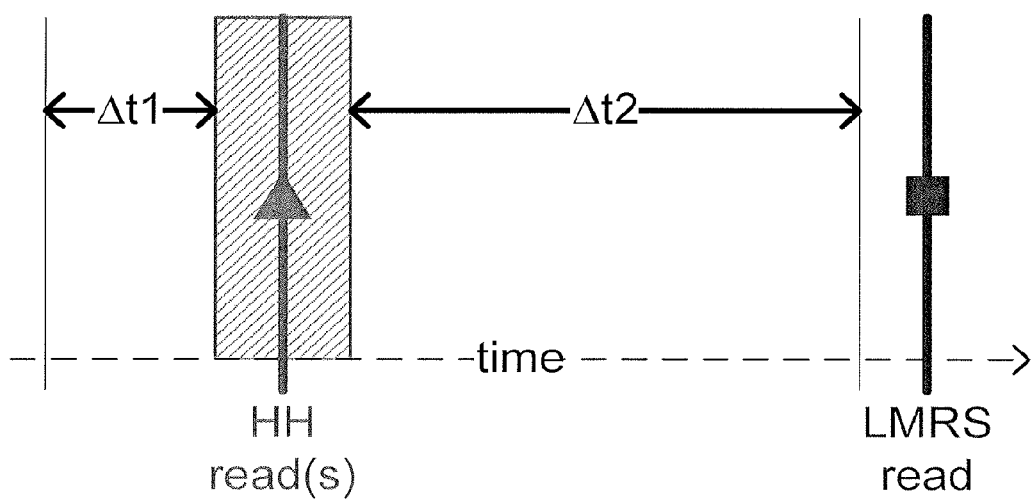
FIG. 12 shows one exemplary missed scan by a boarding area RFID scanner after a lift access product is read by an associated HH RFID scanner.

FIG. 12 shows one scenario where a boarding area RFID scanner has missed reading a lift access product that was read by an associated HH RFID scanner. A missed boarding area RFID scanner event occurs when an HH RFID scanner reads a lift access product, but there is no corresponding boarding area RFID scanner scan record within a period Δt1 before the HH RFID scanner read and a period Δt2 after the HH RFID scanner read.

Each customer boarding a base ski lift should be scanned by a HH RFID scanner. In some cases, human error may result in a customer not being scanned by a HH RFID scanner. Although not considered a failure of system 100, statistics are collected and evaluated to avoid distorting the data.

Figure 13:
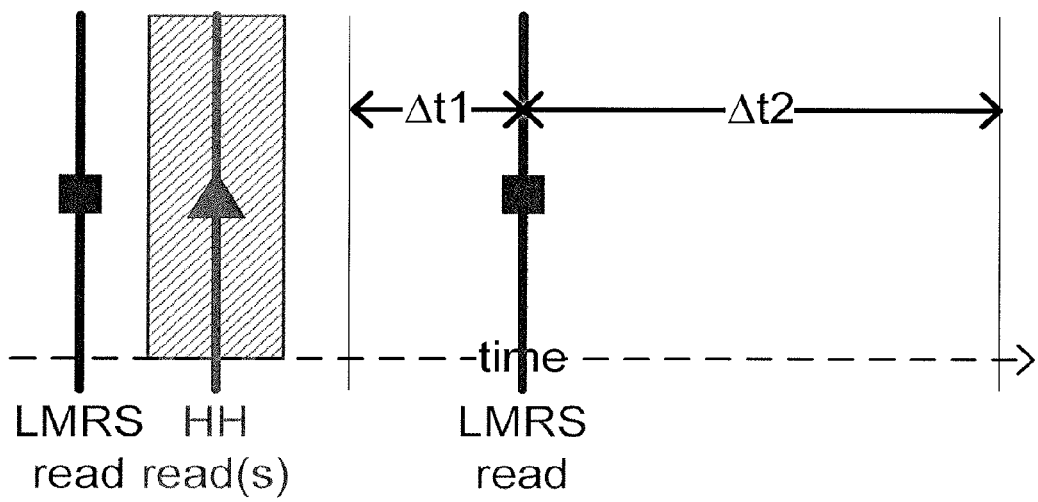
FIG. 13 shows two successfully matched scan records from a boarding area RFID scanner and an HH RFID scanner followed by a second scan record from the boarding area RFID scanner with no matching scan record from the HH RFID scanner.

A missed HH RFID scanner read is considered to have occurred when either of the following two conditions are met: (a) a boarding area RFID scanner read event occurs, and there is no corresponding HH RFID scanner read event within Δt1 before the boarding area RFID scanner read event, and within the period Δt2 after the boarding area RFID scanner read event; and (b) the boarding area RFID scanner read event is not considered a duplicate event. See FIG. 13 which shows a successful match of a boarding area RFID scanner read events and a HH RFID scanner read event, followed by a missed HH RFID scanner read event.

The goal of each RFID scanner 104 located at a boarding area of a ski lift is to generate a single RFID scanner read event for each customer boarding the ski lift. Thus, duplicate boarding area RFID scanner read events for a customer boarding the ski lift constitutes a failure of the RFID scanner (and/or its supporting sub-system). When trying to categorize a boarding area RFID scanner read event as a potential duplicate, the following heuristic is used: since the minimum time required for a customer to ride the ski lift and ski back down to the boarding area is Δt3, if multiple boarding area RFID scanner read events for a single customer occur in less than time period Δt3, they are potential duplicates. In rare cases, a customer may be read by the boarding area RFID scanner, leave the lift line, and return to the lift line in less than tie period Δt3. If this situation occurs, it is assumed that the lift access product of the customer will be read by an HH RFID scanner read again.

Figure 14:
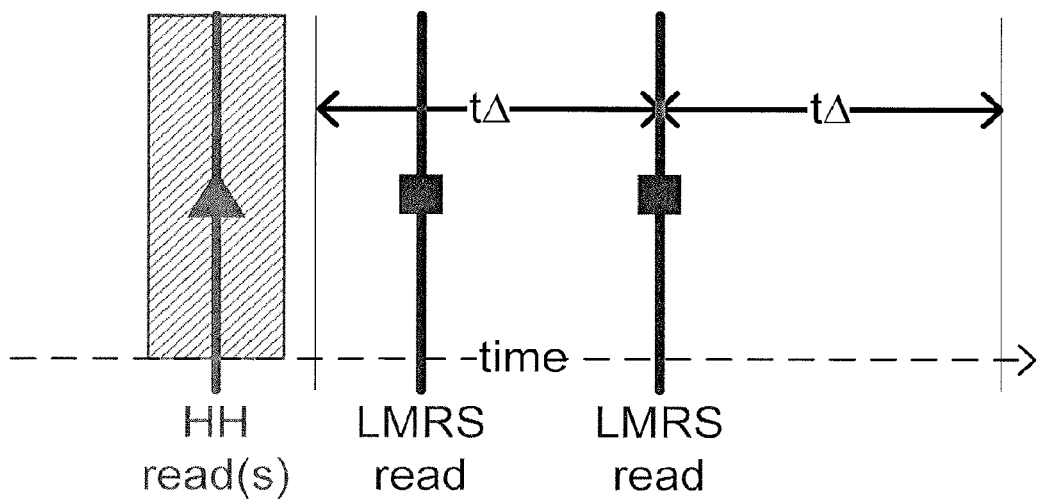
FIG. 14 shows a successful pairing of two scan records from an HH RFID scanner and a boarding area RFID scanner followed by a duplicate scan event from the boarding area RFID scanner.

Duplicate boarding area RFID scanner read events are thus identified when two conditions are met: (a) multiple boarding area RFID scanner read events occur within Δt3; and (b) there are no intervening individual HH RFID scanner reads for the same lift access product between the boarding area RFID scanner read events. Also of note, a duplicate boarding area RFID scanner read event is always accompanied by one of: (a) a successful match between a boarding area RFID scanner read event and an HH RFID scanner read event; and (b) a missed HH RFID scanner read. FIG. 14 shows a successful pairing of an HH RFID scanner read event and a boarding area RFID scanner read event followed by a duplicate boarding area RFID scanner read event.

Thus, the performance of system 100 may be determined by counting successful parings of scanned events and counting failures. For example, integrity tool 690 may continually and/or periodically process scan records 128 of raw RFID database 106 to count these successes and failures, thereby monitoring operation of system 100. In one example of operation, integrity tool 690 processes scan records 128 of raw RFID database 106 for each customer (i.e., each identifier 122) for a given day. By identifying the number of successful paired scan records, and grouping pairing failures, for each boarding area RFID scanner and HH RFID scanner, integrity tool 690 may identify components of system 100 that have problems and may produce one or more reports of component operability status. Such reports may highlight areas for hardware and/or operator and operating strategy improvements.

When performing the analysis of raw RFID database 106, integrity tool 690 associates each scan record with only one success or failure. For example, integrity tool 690 may first identify all successful scan record pairings, and then identify failures in the remaining scan records to identify failed HH RFID scanner reads and duplicate HH RFID scanner reads.

Since each HH RFID scanner (e.g., HH RFID scanner 104(4)) may include a barcode reader, the use of the barcode reader should also be noted since this may result in a higher level of missing HH RFID scanner reads that actually occur. In one embodiment, integrity tool 690 may import barcode scan information for use in matching boarding area RFID scanner scan records. In an alternate embodiment, where barcode scanning by HH RFID scanners may occur, HH RFID scanner read failures are ignored.

Each HH RFID scanner 104 may include a display such that upon scanning each identifier 122, the HH RFID scanner receives an image, from computer 102, of the customer associated with the scanned identifier 122 (i.e., computer 102 returns an image of the customer associated with the lift access product 120 identified by the scanned identifier 122). Thus, the operator of the HH RFID scanner may verify that the user of the identified lift access product 120 is the associated customer, to prevent fraudulent use of lift access product 120.

Computer 102 may also return other information to the HH RFID scanner, such as customer demographic information that may further identify the associated customer and to allow for a highly customized customer experience for high value guests; club member profiles that allow the HH RFID scanner operator to identify Club Members.

Figure 15:
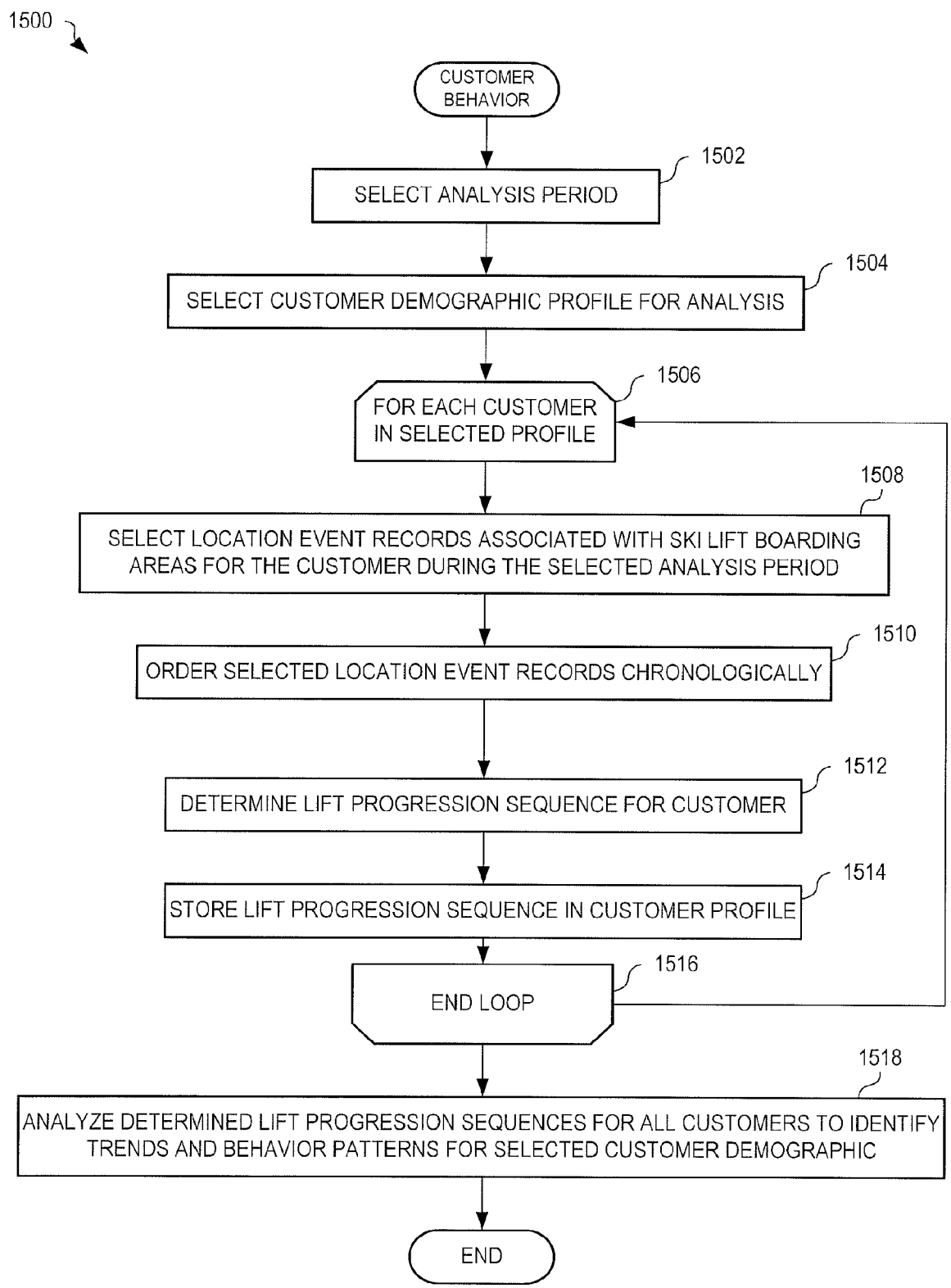
FIG. 15 is a flowchart illustrating one exemplary customer profiling process, in an embodiment.

As shown in FIG. 6, services application 118 may include a customer profiler module 610 that operates to process information of location database 112 and generate customer profile information for one or more customers. FIG. 15 is a flowchart illustrating one exemplary customer profiling process 1500. Process 1500 is implemented within customer profiler module 610, for example.

In step 1502, process 1500 selects an analysis period. In one example of step 1502, a default period of 24 hours, from 0000 through 2359 of the current day, is selected. In another example, a user of system 100 interacts with customer profiler module 610 to select a period including several past days. In step 1504, process 1500 selects a customer demographic profile for analysis. In one example of step 1504, the user interacts with customer profiler module 610 to select all customer demographic profile areas.

Steps 1506 through 1516 form a loop that is executed for each customer identified by steps 1502 and 1504. In step 1506, process 1500 selects each customer identified by steps 1502 and 1504 in turn. In step 1508, process 1500 selects location event records associated with ski lift boarding areas for the customer during the selected analysis period. In one example of step 1508, customer profiler module 610 selects location event records 132 from location database 112 for the customer identified in step 1506 for the analysis period selected in step 1502. In step 1510, process 1500 orders the selected location event records chronologically. In one example of step 1510, customer profiler module 610 sorts the selected location event records 132 of step 1508 into ascending chronological order. In step 1512, process 1500 determines the lift progression for the customer. In one example of step 1512, customer profiler module 610 determines the sequence in which the customer boards ski lifts during the selected analysis period. In another example, customer profile module 610 determines a vertical feet profile based upon the ski lifts used by the customer, and stores a vertical feet per day and/or a vertical feet per hour value. In step 1514, process 1500 stores the determined lift progression sequence in the customer's profile. In one example of step 1514, customer profiler module 610 stores the lift progression sequence in association with the customer of step 1506 within customer profile database 612. Steps 1506 through 1516 repeat for each customer identified by steps 1502 and 1504.

Once location event records 132 have been processed for all customers identified by steps 1502 and 1504, in step 1518, process 1500 analyzes the determine lift progression sequences for all customers selected by steps 1502 and 1504 to identify trends and behavior patterns for the selected customer demographic profile of step 1504. This profile information may then be used as described below.

Fraud Detection

Figure 7:
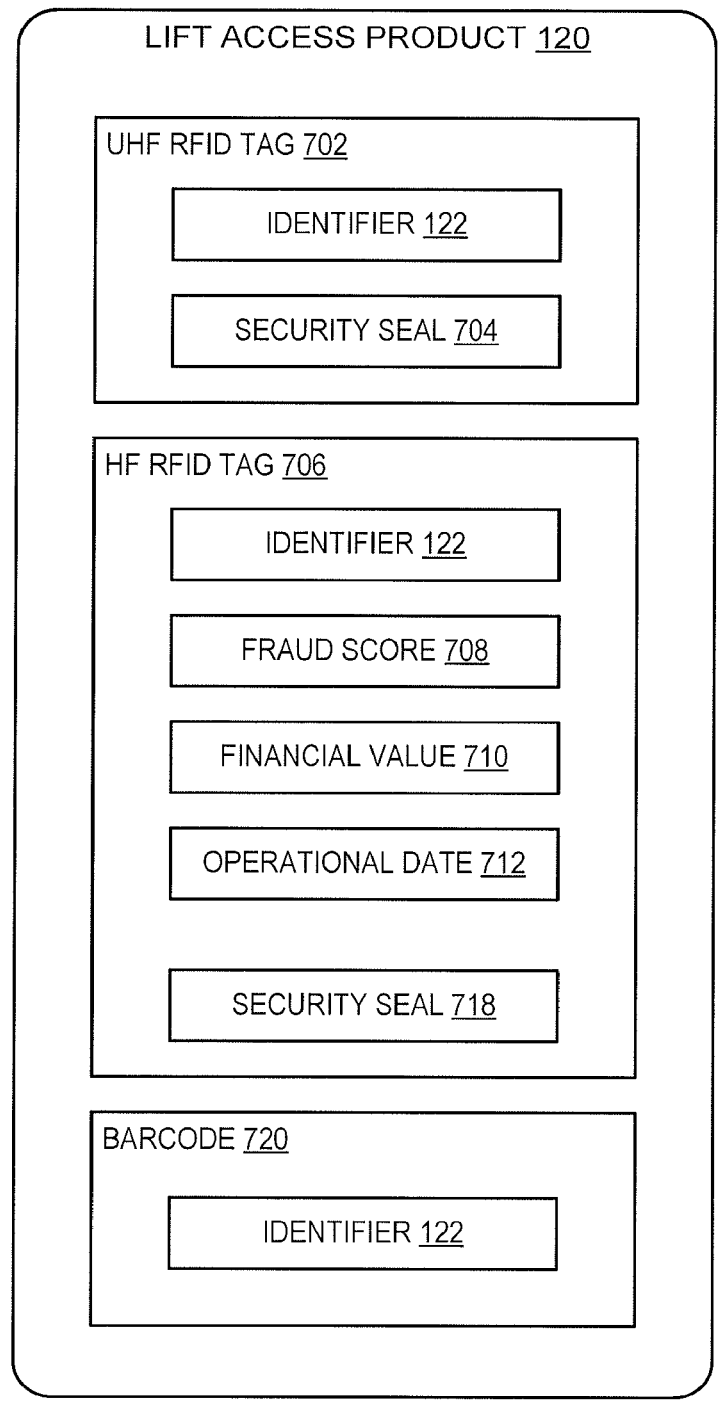
FIG. 7 shows one exemplary lift access product including a UHF RFID tag, an HF RFID tag, and a barcode.

By scanning lift access products 120 at each lift boarding area, the probability of detection of fraudulent lift use increases as compared to current techniques where lift tickets are scanned only at base lifts (i.e., lifts located at the base area of the resort). Each RFID scanner 104 includes application software 127 that includes offline fraud detection algorithms that evaluate each scanned lift access product 120. As shown in FIG. 7, each lift access product 120 may include a UHF RFID tag 702, an HF RFID tag 706 and a barcode 720. UHF RFID tag 702 may include identifier 122 and a security seal 704; HF RFID tag 706 may include identifier 122, a fraud score 708, a financial value 710, an operational date 712 and a security seal 718. In an embodiment, each identifier 122(n) has a different barcode and RFID tag identifier for each customer n.

In an embodiment, application software 127 evaluates security seal 704 of UHF IF RFID tag 702 and/or security seal 718 of HF RFID tag 706. Since security seals 704 and 718 are based upon content of each RFID tag 702, 706, respectively, fraudulent tampering with tag contents may be identified by application software 127. Furthermore, application software 127 may compare operational date 712 against the date value of RTC 126 to determine whether lift access product 120 is valid for the current day. That is, RFID scanner 104 may determine validity of lift access product 120 offline. RFID scanner 104 may thus validate each lift access product 120 without necessarily communicating with computer 102.

Application software 127 may compare fraud score 708 of HF RFID tag 706 with a threshold value to determine if fraudulent use of lift access product 120 is suspected. If the value of fraud score 708 is greater than the threshold value, lift access product 120 may be flagged by RFID scanner 104 for further evaluation.

Even though each lift access product 120 is evaluated at each scan, scan records 128 and location event records 132 may be further evaluated by a fraud detector 660 within services application 118 of computer 102. In particular, fraud detector 660 processes location event records 132 of location database 112 to identify fraudulent use of lift passes. Fraud detector 660 may also utilize a product validity database 662 that contains lift access product validity information to further evaluate the validity in use of each lift access product 120. For example, product validity database 662 may define one or more of an operational date range, a number of days purchased, and a number of days used.

Fraud detector 660 also processes location event records 132 of location database 112 to identify potentially fraudulent behavior associated with each lift access product 120. Fraud detector 660 may process location events records associated with one lift access product 120 to compare current behavior with previously recorded behavior. Where current and previous behavior is dissimilar, fraud detector 660 may increment a fraud counter associated with the lift access product 120. For example, where a skier has a history of skiing in a difficult terrain area and currently is skiing in a beginner area, fraud detector 660 increases the fraud score for each uncharacteristic run made.

In one embodiment, fraud detector 660 utilizes customer profiler module 610 to profile one or more previous days skiing and to profile the current day of skiing for each currently active lift access product (i.e., each lift access product recently detected). By comparing previous and current profiles associated with each active lift access product 120, fraud detector 660 may increment the fraud score associated with the lift access product if the profiles are dissimilar.

In another method of fraud detection, application software within each RFID scanner 104 associated with a ski lift loading zone may count and display the number of lift access products 120 boarding each chair. Thus, upon noticing a discrepancy with the displayed number and the number of actual people boarding, ski lift attendants may note the discrepancy such that the issue may be resolved by manual scanning of these customers upon arrival at the top of the lift.

Fraud detector 660 may also track previous fraudulent use of a lift access product thereby modifying the fraud score 708 accordingly.

Application software 127 within RFID scanner 104 may increase fraud score 708 of a lift access product 120 if one or both of security seals 704 and 718 indicate tampering with one or both of RFID tags 702 and 706. Where a customer is also renting equipment tagged with one or more RFID tags, and one or more of these rental equipments tags changes, RFID scanner 104 increases fraud score 708 of the associated lift access product 120.

Fraud detector 660 may also increase a fraud score associated with a lift access product 120 as time between the last attendant or biometric check elapses, thereby ensuring that each lift access product 120 is verified periodically. Fraud detector 660 may also increase a fraud score associated with a lift access product 120 if the lift access product is associated with a different group (e.g., group 514) of lift access products than usual. Fraud detector 660 may also increase a fraud score associated with a lift access product 120 if a previously used parking tag has not been used. Fraud detector 660 may also increase a fraud score associated with a lift access product 120 if other programs with affinity to the lift access product are not used. Fraud detector 660 may also increase a fraud score associated with a lift access product 120 if the lift access product 120 is used of a different day or time of week than previously recorded.

The fraud score associated with each lift access product 120 thus increases as potentially fraudulent events or circumstances occur. Since fraud score 708 may be evaluated each time the lift access product 120 is scanned, fraudulent use of the lift access product 120 is more rapidly identified and more easily resolved. For example, upon determining that fraud score 708 exceeds the threshold value, RFID scanner 104 may indicate that the last scanned lift access product 120 needs further evaluation. This indication typically occurs as lift access product 120, carried by a customer, enters a ski lift line, and/or boarding area, and is identified by the RFID scanner 104 thereat. In such a case, the attendant may ask the customer for proof of identity (e.g., by matching a fingerprint or verifying the picture, height, etc., of the customer associated with the lift access product 120). Upon successful proof of identity, the associated fraud score 708 may be reset and the customer is allowed to continue without interruption (at least until their fraud score exceeds the threshold again).

Last Scanned Location for Search and Rescue

When a customer is reported lost, resort safety personnel may utilize a search module 602 within services application 118 of system 100 to determine a last scanned location of the customer's lift access product 120 by searching for the associated identifier 122 within location database 112. Upon determining the last know location of the customer, the resort safety personnel may better focus the search to areas nearer to that last known location, thereby positively impacting the time to rescue.

Staff Tracking

Typically, a sign-in and sign-out method is used to ensure all staff return from on-slope operations at a ski resort at the close of day. However, when using this sign-in/sign-out method, if a staff member fails to sign-out, an on-slope search process is usually initiated for safety reasons. By issuing each employee of the resort with a lift access product 120, operations staff may improve safety of on-slope staff by tracking staff movements on and off the slope. In an embodiment, a staff tracking module 604 within services application 118 may automatically operate to ensure all staff going on-slope, return. For example, staff tracking module 604 may include intelligent algorithms that monitor staff movements and raise an alert when unexpected behavior or situations (e.g., a staff member failing to return from an on-slope activity).

Furthermore, when an alert situation is determined, staff tracking module 604 may provide a movement history of the missing staff member to enable faster rescue and/or resolution of the alert. In an embodiment, system 100 may include RFID scanners (e.g., RFID scanner 104) within staff accessible locations and commonly accessed areas to improve staff tracking and thereby increase staff safety.

Customer Profiling

Customer profiler module 610 may utilize information stored within customer information 116 and stored location event records 132 within location database 112 to determine and categorize an activity level of the customer. Customer profiler module 610 may then store this customer profile information within customer profile database 612 in relation to customer information 116 and the customer's identifier 122.

As described above, customer profiler module 610 may determine the vertical feet per hour skied by each customer, and store the vertical feet per hour value as a measure of skiing intensity. Skiing intensity may be further analyzed by determining the duration for which the intensity level is maintained. For example, one customer may ski hard for one hour and then take a break before skiing hard again, whereas another customer may ski hard for the entire day. Further, customer profiler module 610 may determine customer ski lift riding patterns and thereby associate probabilities for these patterns based upon customer segmentation, product segmentation, time of year, day of week, weather conditions, and customer volume at each lift and/or at the resort. For example, certain customers may prefer to ski where lifts and trails are less crowded. By monitoring these determined behavioral patterns, strategic placement of new lifts and prioritization of lift upgrades may be determined.

Customers may be categorized by age group, gender, and other demographics. The determined customer profile (as stored within customer profile database 612) may thus be applied with these categorizations to predict behavior of customers at the resort. customer profiler module 610 may also analyze lift progression of each customer, to form statistical information on lift riding patterns by customers of each demographic and profile. Such information may be used by a lift progression model 632, as described below.

Services application 118 may include a modeling tool 630 that models customer behavior based upon customer profiles and measured on-slope characteristics. Modeling tool 630 may be used to predict when and where large customer numbers (i.e., crowds) will occur, thereby allowing operation of the mountain to be adjusted to optimize mountain staff dispatch, grooming priorities, messaging in on-slope displays, and snow making priorities. For example, if historical data indicates that certain weather conditions and customer demographics result in heavy use of certain lifts, additional staff may be dispatched to that lift in preparation of the crowds and on-slope displays may suggest use of alternate areas to avoid overcrowding of those lifts.

Modeling tool 630 may utilize or incorporate lift progression model 632 to model lift riding patterns of customers based upon their customer profile and/or demographic. Modeling tool 630 may thereby predict customer on-slope movements to model crowd behavior for predictive management purposes. For example, modeling tool 630 may display a trail map with predicted crowd behavior for a selected time based upon historic information, profiled behavior and predicted and/or measured customer population on-slope.

Lift usage statistics by customer demographic and/or customer profile may be used to analyze the impact of upgrading lifts and/or building new lifts. For example, such information may help prioritize lift upgrades and/or additions based on the customer demographic/profile to be impacted by the upgrade/addition.

Ski Patrol Coverage

Staff tracking module 604 may also provide visualization of ski patrol coverage of the resort, thereby allowing areas that are over- or under-patrolled to be determined. For example, by identifying staff members operating ski patrol duties, staff tracking module 604 may monitor ski patrol members' use of lifts to determine the frequency with which trails are patrolled in comparison to the number of customers within the associated areas.

Grooming

Modeling tool 630 may be used to predict the effect of grooming practices based upon customer demographics and profiles. Such modeling may also allow grooming practices to be selected that target desired customers.

Snow Making

Similarly, modeling tool 630 may predict the effects of snow making upon customer demographics and profiles, thereby allowing snowmaking practices to be adjusted based upon a desired customer demographic and profile effect.

Real-Time Lift Line Statistics

A lift wait analyzer 650 utilizes one or more algorithms to determine lift wait times. Where only a boarding zone of a ski lift is covered by RFID scanners (e.g., RFID scanners 104), lift wait times can only be estimated by lift wait analyzer 650. Lift wait analyzer 650 may track repeated access to the lift by customers to determine the access frequency of each returning customer. Based upon average and minimum time intervals, lift wait analyzer 650 may determine if the lift line wait is increasing or decreasing.

Figure 20:
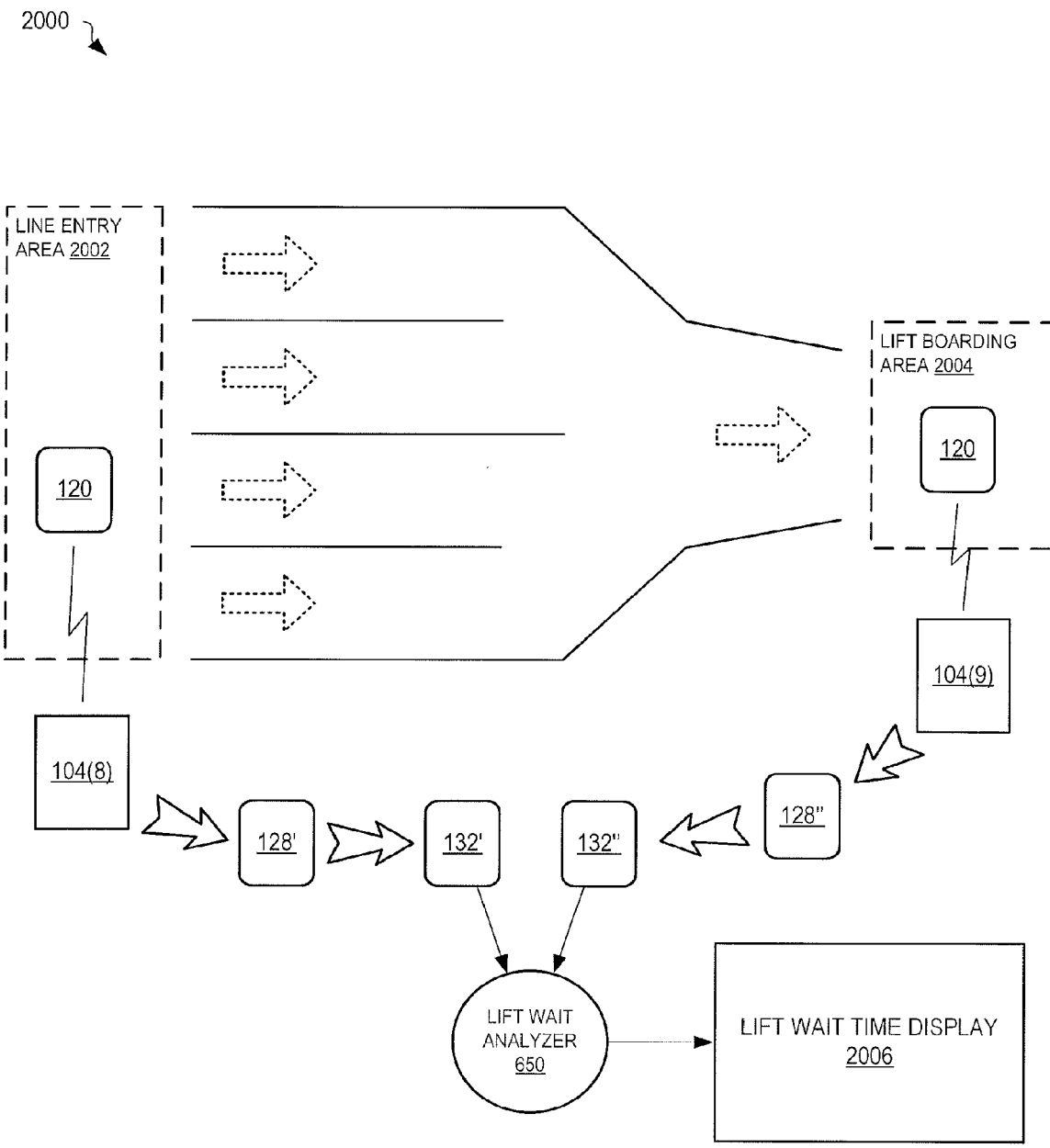
FIG. 20 is a schematic illustrating one exemplary ski lift line and ski lift wait time display.

As shown in FIG. 20, at least one RFID scanner 104(8) scans lift access product 120 at a lift line entry area 2002 and generates a scan record 128'. Scan record 128' is processed by location event generator 110 to generate a location event record 132'. The customer progresses through lift line 2000 and lift access product 120 is scanned by RFID scanner 104(9) as the customer enters a lift boarding area 2004 at the front of lift line 2000. RFID scanner 104(9) generates a scan record 128" that is processed by location event generator 110 to generate a location event record 132". Lift wait analyzer 650 processes location event records 132' and 132" (i.e., by identifying location event records for the same lift access product 120 at the same lift line 2000) and determines the time spent by the customer progressing through lift line 2000 by comparing the timestamps of these location event records. By averaging the lift wait time of several customers progressing through lift line 2000, an average lift line wait time may be determined.

Lift wait analyzer 650 may display real-time lift wait time information on a lift wait time display 2006. In one example, lift wait time display 2006 represents a web page generated by web portal 140 and may be viewed by resort operators. Lift wait time display 2006 may also represent a display of lift wait times on on-slope displays (e.g., kiosks) and/or message boards located at strategic on-slope locations (e.g., at lift drop points). Thus, customers may use the lift wait time information when planning trails to ski. In one example, lift wait times are displayed graphically on a resort map by using color symbols representing lifts, where red indicates long lift line wait, yellow indicates moderate lift line wait, and green indicates minor lift line wait.

Figure 19:
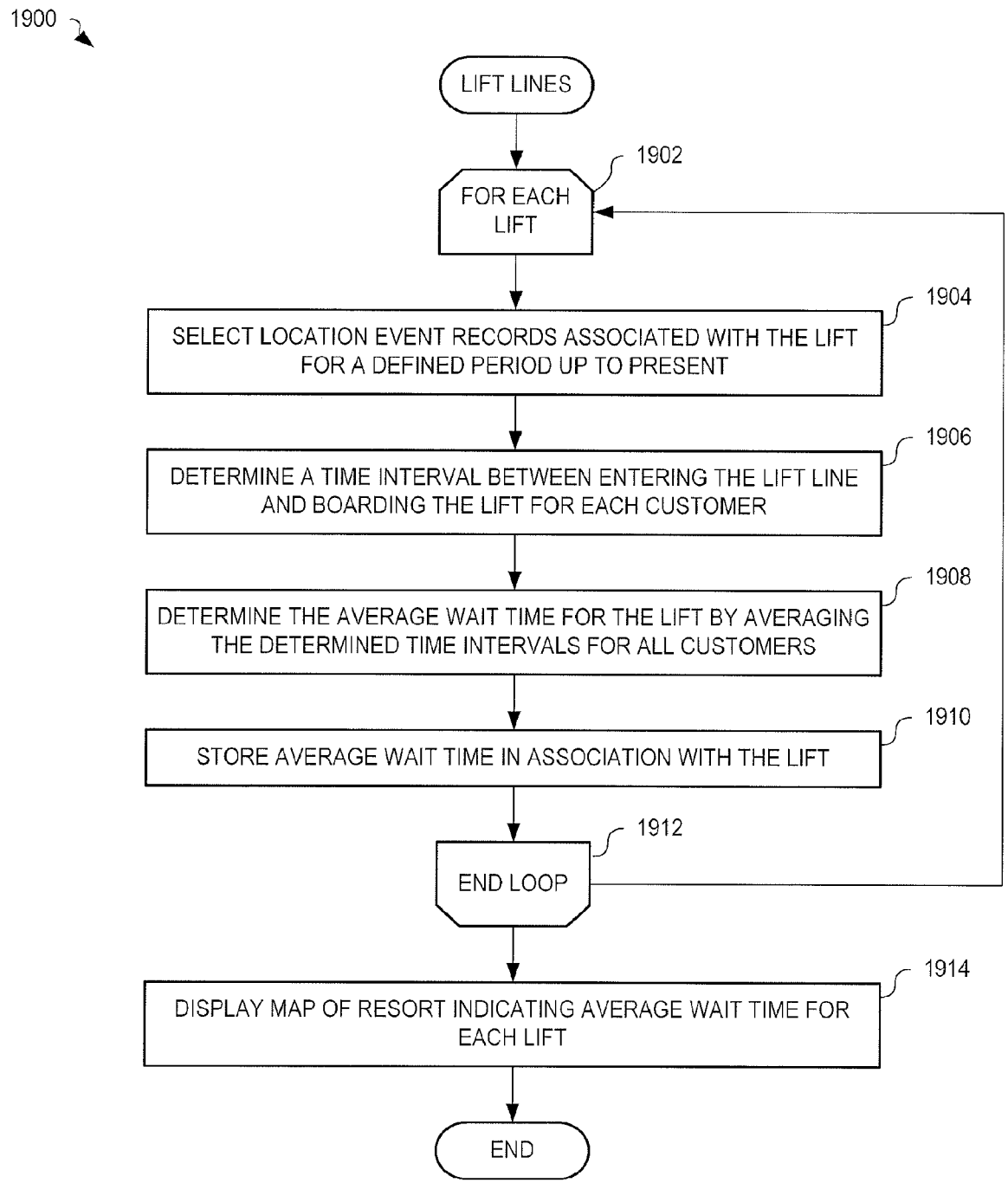
FIG. 19 is a flowchart illustrating one exemplary process for displaying ski lift line wait times, in an embodiment.

FIG. 19 is a flowchart illustrating one exemplary process 1900 for displaying ski lift line wait times. Process 1900 is implemented within lift wait analyzer 650, FIG. 6, for example. Steps 1902 through 1912 form a loop that repeats for each lift of the ski resort. In step 1902, process 1900 selects each ski lift of the resort in turn. In step 1904, process 1900 selects location event records associated with the lift for a defined period up to the present. In one example of step 1904, lift wait analyzer 650 selects location event records 132 from location database 112 for the identified lift at lift line entry area 2002 and at lift boarding area 2004 for all customers. In step 1906, process 1900 determines a time interval between entering the lift line and boarding the lift for each customer. In one example of step 1906, lift wait analyzer 650 first sorts the selected location event records by customer, thereby pairing location event records 132 for lift line entry area 2002 and at lift boarding area 2004 for each customer. Lift wait analyzer 650 then compares the time stamp of each location event record of each pair to calculate the time spent by the customer progressing through the list line. In step 1908, process 1900 determines the average wait time for the lift by averaging the determined time intervals for all customers utilizing the lift within the defined period of step 1904. In one example of step 1908, lift wait analyzer 650 sums the determined time intervals of step 1906 and divides by the number of determined time intervals to generate an average wait time for the lift of step 1902. In step 1910, process 1900 stores the average wait time in association with the lift of step 1902. In one example of step 1910, lift wait analyzer 650 stores the determined average wait time locally. In another example of step 1910, lift wait analyzer 650 stores the determined average wait time within a database in association with the lift selected in step 1902.

Steps 1902 through 1912 repeat for each lift for which average lift wait time is determined. Where a ski lift does not have an RFID scanner 104 at lift line entry area 2002, lift wait times may not be determined and this lift is not processed in steps 1902 through 1912.

In step 1914, process 1900 displays a map of the resort indicating average wait time for each lift of step 1902. In one example of step 1914, lift wait analyzer 650 utilizes web portal 140 to generate a lift wait status page containing a resort map upon which color indicators are displayed, adjacent to each list hoarding area, to indicate lift line lengths. For example, a green circle may indicate minimum lift wait times, a yellow square may indicate moderate lift wait times and a red triangle may indicate extended lift wait times. This lift wait status page may be displayed upon on-slope kiosks (e.g., kiosk 528, FIG. 5) and other displays. A resort operator and/or manager may view the lift wait status page to monitor crowd behavior and to determine if additional or fewer lift operators are required at any particular ski lift.

Marketing

Information of customer profile database 612 may be used together with customer demographic information to determine targets for specialized advertising and to create special offers. For example, advertising and/or special offers may be used to target a certain customer demographic and/or profile category for a certain day, where historical information indicates that such customers utilize the resort less frequently on that day.

Predictive on-mountain population modeling

Modeling tool 630 may utilize historical information from location database 112, customer profile database 612, and customer information 116 to predict on-slope population by one or more of day, hour, zone, and customer profile. Such predictions may then be used to drive marketing campaigns. Modeling tool 630 may use or incorporate lift progression model 632 to predict on-slope crowd behavior and thereby identify under-utilized areas of the resort. By analyzing customer profile database 612, certain demographics and customer types may be identified for additional marketing to increase attendance of those under-utilized areas.

Figure 16:
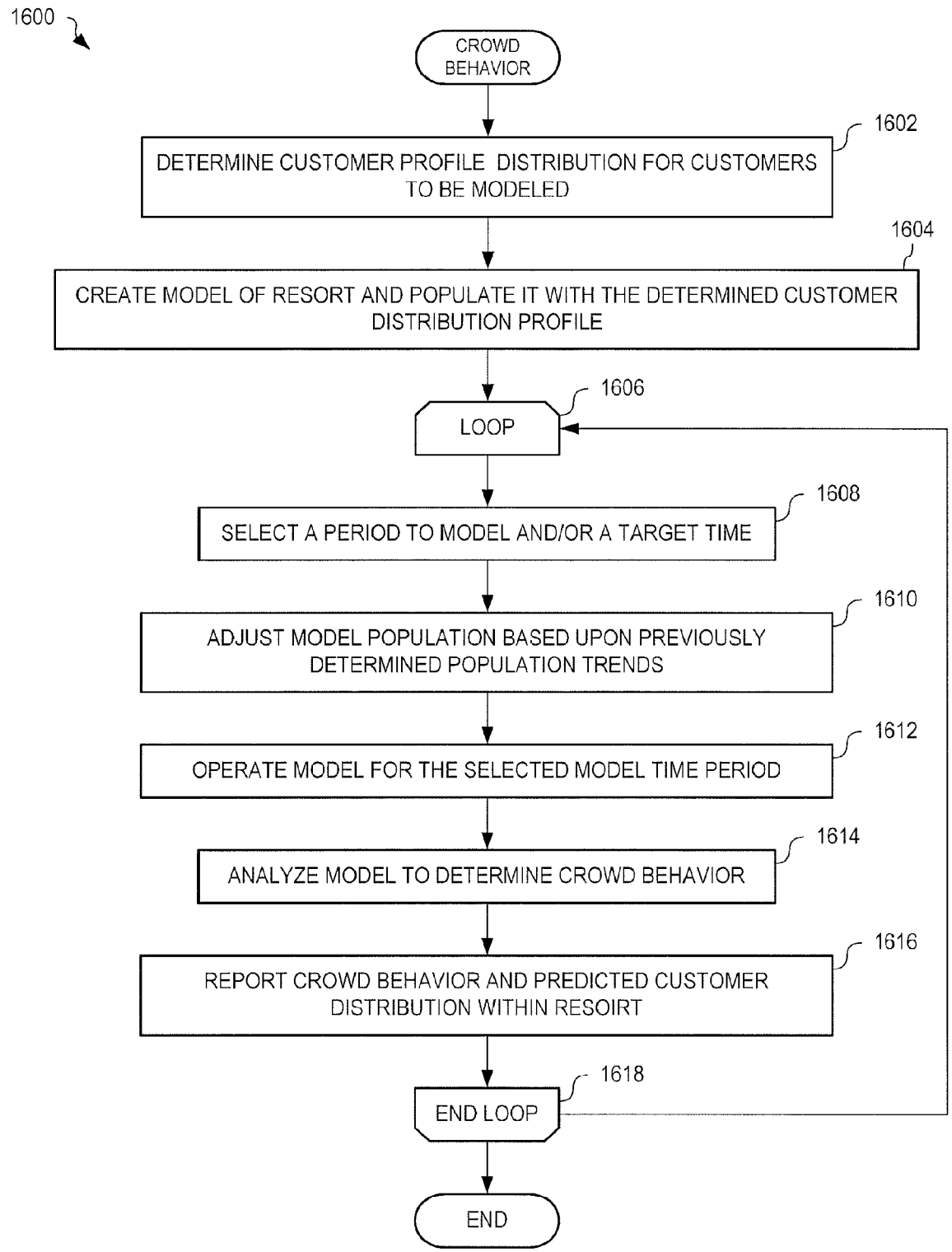
FIG. 16 is a flowchart illustrating one exemplary process for modeling crowd behavior, in an embodiment.

FIG. 16 is a flowchart illustrating one exemplary process 1600 for modeling crowd behavior. Process 1600 may be implemented within modeling tool 630, for example. In step 1602, process 1600 determines a customer profile distribution to be modeled. In one example of step 1602, a snapshot of customers scanned and identified at the resort is determined from location database 112 and a profile distribution is then determined for those customers based upon customer profile database 612. In step 1604, process 1600 creates a model of the resort and populates it with the determined customer profile distribution of step 1602. In one example of step 1604, modeling tool 630 creates a computer model 631 of the resort populated with customers identified in step 1602, where these customers have modeled behavior based upon determined profiles of those customers in customer profile database 612. Steps 1606 through 1618 of process 1600 form a loop that operates to model customer behavior for a selected period or until a specified time.

In step 1608, process 1600 selects a period to model and/or a target time. In one example of step 1608, a user inputs a target time for which crowd behavior is to be modeled. In another example of step 1608, a period is input for which modeling is to repeatedly occur. In step 1610, process 1600 adjusts model population based upon previously determined population trends. In one example of step 1610, population of model 631 is adjusted based upon the modeled time of day and previously determined population changes (e.g., on-slope population decrease at lunch time). In step 1612, process 1600 operates the model for the period selected in step 1608. In one example of step 1612, modeling tool 630 operates model 631 for the selected period, modeling behavior of customer population based upon modeled profile behavior. In step 1614, process 1600 analyzes the model to determine crowd behavior. In one example of step 1614, modeling tool 630 analyzes model 631 to determine movements, lift line lengths, and population distribution after the modeled period. In step 1616, process 1600 reports crowd behavior and predicted customer distribution within the resort. In one example of step 1616, modeling tool 630 generates one or more reports and displays of the determined crowd behavior.

Steps 1606 through 1618 repeat for each desired period to be modeled. Thus, modeling tool 630 may generate a series of output predicting crowd behavior over a desired period.

New Customer Capture

As described above, lift access products 120 may be divided into two classes: a first class lift access product (e.g., season passes) has descriptive information associated therewith, and a second class lift access product (e.g., free sell lift tickets) does not include such associated information. However, each lift access product includes unique identifier 122 which is encoded within the RFID tag and may be printed in readable form on the lift access product.

The lift access products may also contain a URL of web portal 140. System 100 captures scan records 128 and location event records 132 for all lift access products, irrespective of class. However, to access statistics based upon these records, a customer must have an account with the resort that includes an affiliation to the identifier of the lift access product. For customers that are season pass holders, that account and affiliation may be created automatically by the resort and/or by the customer providing registration information online. A customer who has purchased and used a second class lift access product (i.e., a free sell lift ticket) may create an account with the resort by accessing web portal 140, and may then enter the identifier 122 of the second class lift access product to associate it with the account. Having created the account and entered the affiliation to at least one lift access product, the customer may use the account to access statistical information determined by system 100 on the affiliated lift access product(s). The account also provides the resort with a way of gathering new customer data and for building customer loyalty. The customer may create the account at any time and may register the lift access product with the account at any time; customers may register the lift access product prior to and after use (i.e., after they have returned from their ski vacation).

Real-Time Marketing

Marketing analyzer 670 may operate to process location database 112 for current customer activity (e.g., activity for the current day) to prepare instant offers and discounts for customers currently utilizing the ski resort. For example, marketing analyzer 670 may utilize customer profiler module 610 to identify one or more customers having a certain activity profile and target those customers, using on-slope messaging, for example, with discounts and suggested activities. For example, messages may be sent to active customers offering discounts in certain restaurants at certain times. In another example, messages may be sent to certain customers suggesting alternative and less crowded trails. These customers may view their messages and offers at any on-slope kiosk. Such marketing may also attempt to distribute customers over the resort and avoid overcrowding in certain restaurants. For example, a certain group of customers identified by profile and demographic may be offered discounts to utilize certain restaurants before anticipated crowds.

Customer Incentives

Each customer may readily avail themselves of statistical information of experiences received at the ski resort. For example, statistics web site 534 may be access via on-slope kiosks, web browsers, cell phones, etc. Thus, customers are more likely to return to the resort to avail themselves of these statistics and facilities. In particular, based upon stored location event records 132 within location database 112, system 100 may provide interactive trail maps that indicate a customer's lift utilization (with time stamps), and trails experiences. As described above, customers may interactively indicate trails experienced based upon lift utilization. Statistics may be provided that indicate the number of days skied in a season (or other denoted period), the total number of vertical feet skied, and the different resorts frequented.

In one embodiment, system 100 monitors each customer and awards the customer a category based upon the customer's activity level. For example, within system 100, customers may be associated with one of four customer activity categories: platinum, gold, silver, and bronze. Each customer may accumulate 'experience points' based upon their tracked activities at one or more ski resorts. For example, a customer may earn experience points by skiing different zones in a ski resort. Each ski lift utilized by a customer may earn experience points, and additional experience points may be added for each different ski lift utilized at a resort. Each day skied at a resort may earn experience points. Experience points may also be added based upon the number of vertical feet skied by the customer. The number of different resorts skied may earn additional experience points. Based upon the number of experience points earned by the customer, system 100 associated the customer with one of the four customer activity categories.

Each resort may then offer facilities to each customer based upon the customer's associated activity category. In one example, a gold category customer may receive redemption rewards of a higher value than those received by a silver customer.

Customers may also publish their information to social networking sites. For example, a customer may elect to have location and/or statistical information published to their Facebook™ account, thereby allowing their 'friends' to view their experiences.

Mountain Operations may utilize information within location database 112 to generate a time-lapse view of the ski resort showing historical or projected congestion in the ski lift network at the resort. Such information may help the ski resort operators and/or management plan for changes and additions at the resort.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A computer-based method for automatic identification of a photographed customer at a ski resort, comprising,
identifying a profile of the customer, the profile configured to predict preferences of the customer based on previous activities of the customer;
suggesting activities to the customer, based on the profile, wherein at least one of the suggested activities includes having a photograph taken at a photography area;
detecting, at the photography area using a scanner, a customer identifier from a lift access product associated with the customer;
associating a photograph taken of the customer at the photography area with said customer identifier; and
allowing the customer electronic access to the photograph for possible purchase by the customer.

2. The computer-based method of claim 1, wherein the photograph is sent via e-mail to the customer.

3. The computer-based method of claim 1, wherein the photograph is uploaded onto a web site, wherein a method of access to the web site is then conveyed to the customer.

4. The computer-based method of claim 1, wherein the scanner is an RFID scanner.

5. The computer-based method of claim 1, wherein the photography area is a pre-designated location on a ski slope, the scanner is positioned in proximity to the pre-designated location and is configured to capture the customer identifier of the customer passing in proximity to the pre-designated location.

6. The computer-based method of claim 5, wherein the pre-designated location is a feature in a terrain park.

7. A system for automatic identification of a photographed customer at a ski resort, comprising,
a scanner, configured to detect, at a photography area, a customer identifier from a lift access product associated with the customer;
a computer configured to associate a photograph taken of the customer at the photography area with said customer identifier,
wherein the computer allows the customer access to the photograph for possible purchase by the customer via an electronic network; and
a profile identifier configured to identify a profile of the customer, the profile configured to predict preferences of the customer based on previous activities of the customer;
an activity predictor configured to suggest activities to the customer, based on the profile,
wherein at least one of the suggested activities includes having a photograph taken at the photography area.

8. The computer-based method of claim 1, further comprising a message being sent to the customer including a discount incentive for having a second photograph taken at the photography area.

9. The system of claim 7, wherein the scanner is an RFID device.

10. A system for automatic identification of a photographed customer at a ski resort, comprising,
a profile identifier configured to identify a profile of the customer, the profile configured to predict preferences of the customer based on previous activities of the customer;
an activity predictor configured to suggest activities to the customer, based on the profile, wherein at least one of the suggested activities includes having a photograph taken at a photography area;
a scanner, configured to detect, at the photography area, a customer identifier from a lift access product associated with the customer;
a computer configured to associate a photograph taken of the customer at the photography area with said customer identifier,
wherein the computer allows the customer access to the photograph for possible purchase by the customer via an electronic network; and
a loyalty point generator configured to generate loyalty points to the customer for activities performed by the customer, wherein one of the activities for which loyalty points can be generated includes having the photograph taken at the photography area.

11. A system for automatic identification of a photographed customer at a ski resort, comprising,
a profile identifier configured to identify a profile of the customer, the profile configured to predict preferences of the customer based on previous activities of the customer;
an activity predictor configured to suggest activities to the customer, based on the profile,
wherein at least one of the suggested activities includes having a photograph taken at a photography area;
a scanner, configured to detect, at a photography area, a customer identifier from a lift access product associated with the customer;
a computer configured to associate a photograph taken of the customer at the photography area with said customer identifier,
wherein the computer allows the customer access to the photograph for possible purchase by the customer via an electronic network;
the computer further configured to store, as historical information, a location event record indicating the location and time at which the photograph was taken of the customer, and
a message conveyor configured to convey, as an electronic message to the customer, suggesting at least one of the suggested activities.

12. The system of claim 7, wherein the computer is further configured to store a location event record indicating the location and time at which the photograph was taken of the customer and to allow the customer to access an electronic map showing activities of the user, including where the photograph had been taken.

13. The system of claim 10, wherein the customer can redeem the loyalty points for goods and services.

* * * * *